(12) United States Patent
Murayama et al.

(10) Patent No.: US 9,162,655 B2
(45) Date of Patent: Oct. 20, 2015

(54) BRAKE SYSTEM FOR VEHICLE DESIGNED TO IMPROVE DURABILITY AND MANEUVERING FEELING

(71) Applicant: DENSO CORPORATION, Kariya, Aichi-pref. (JP)

(72) Inventors: Takashi Murayama, Kariya (JP); Takahiro Yamaguchi, Kariya (JP); Yasuhiro Sasaki, Okazaki (JP); Masayoshi Ooishi, Anjo (JP); Junji Ishimura, Takahama (JP); Atsushi Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/317,305

(22) Filed: Jun. 27, 2014

(65) Prior Publication Data
US 2015/0001920 A1 Jan. 1, 2015

(30) Foreign Application Priority Data

Jun. 28, 2013 (JP) ................................. 2013-137328

(51) Int. Cl.
| | |
|---|---|
| B60T 8/44 | (2006.01) |
| B60T 7/04 | (2006.01) |
| B60T 13/14 | (2006.01) |
| B60T 13/58 | (2006.01) |
| B60T 13/66 | (2006.01) |
| B60T 13/68 | (2006.01) |

(52) U.S. Cl.
CPC .............. *B60T 7/042* (2013.01); *B60T 13/146* (2013.01); *B60T 13/586* (2013.01); *B60T 13/662* (2013.01); *B60T 13/686* (2013.01)

(58) Field of Classification Search
CPC ....... B60T 8/441; B60T 8/442; B60T 13/145; B60T 13/146; B60T 13/165; B60T 13/166
See application file for complete search history.

(56) References Cited

U.S. PATENT DOCUMENTS

| | | | |
|---|---|---|---|
| 2002/0053206 A1* | 5/2002 | Oka et al. ........................ 60/548 |
| 2004/0004392 A1* | 1/2004 | Kusano ..................... 303/114.1 |
| 2011/0006594 A1 | 1/2011 | Ganzel | |
| 2012/0174575 A1* | 7/2012 | Hirano et al. ................... 60/548 |
| 2012/0248861 A1* | 10/2012 | Miyata et al. .................... 303/10 |
| 2013/0269338 A1* | 10/2013 | Isono .............................. 60/563 |
| 2015/0000266 A1* | 1/2015 | Murayama et al. ............. 60/591 |
| 2015/0001915 A1* | 1/2015 | Murayama et al. ............... 303/3 |
| 2015/0001916 A1* | 1/2015 | Murayama et al. ............... 303/3 |
| 2015/0001917 A1* | 1/2015 | Murayama et al. ............. 303/14 |

(Continued)

FOREIGN PATENT DOCUMENTS

| | | |
|---|---|---|
| JP | 2002-362352 | 12/2002 |
| JP | 2005-162132 | 6/2005 |

(Continued)

*Primary Examiner* — Nicholas J Lane
(74) *Attorney, Agent, or Firm* — Harness, Dickey & Pierce, P.L.C.

(57) ABSTRACT

A braking device for a vehicle is provided which includes a braking simulator, thus resulting in improved mountability of the braking device in the vehicle. The braking device is designed to permit component parts of the hydraulic booster to slide on one another in response to a braking effort on a brake pedal, thereby absorbing an undesirable load on the braking device and also ensuring the stability in operating the brake pedal. This results in improved durability and maneuvering feeling of the braking device.

3 Claims, 10 Drawing Sheets

(56) References Cited

U.S. PATENT DOCUMENTS

| | | | |
|---|---|---|---|
| 2015/0001918 A1* | 1/2015 | Murayama et al. | 303/14 |
| 2015/0001919 A1* | 1/2015 | Murayama et al. | 303/14 |
| 2015/0001920 A1* | 1/2015 | Murayama et al. | 303/14 |
| 2015/0001921 A1* | 1/2015 | Murayama et al. | 303/14 |

FOREIGN PATENT DOCUMENTS

| | | |
|---|---|---|
| JP | 2006-056449 | 3/2006 |
| JP | 2010-137617 | 6/2010 |
| JP | 2012-066647 | 4/2012 |
| WO | WO 2009/058916 | 5/2009 |

* cited by examiner

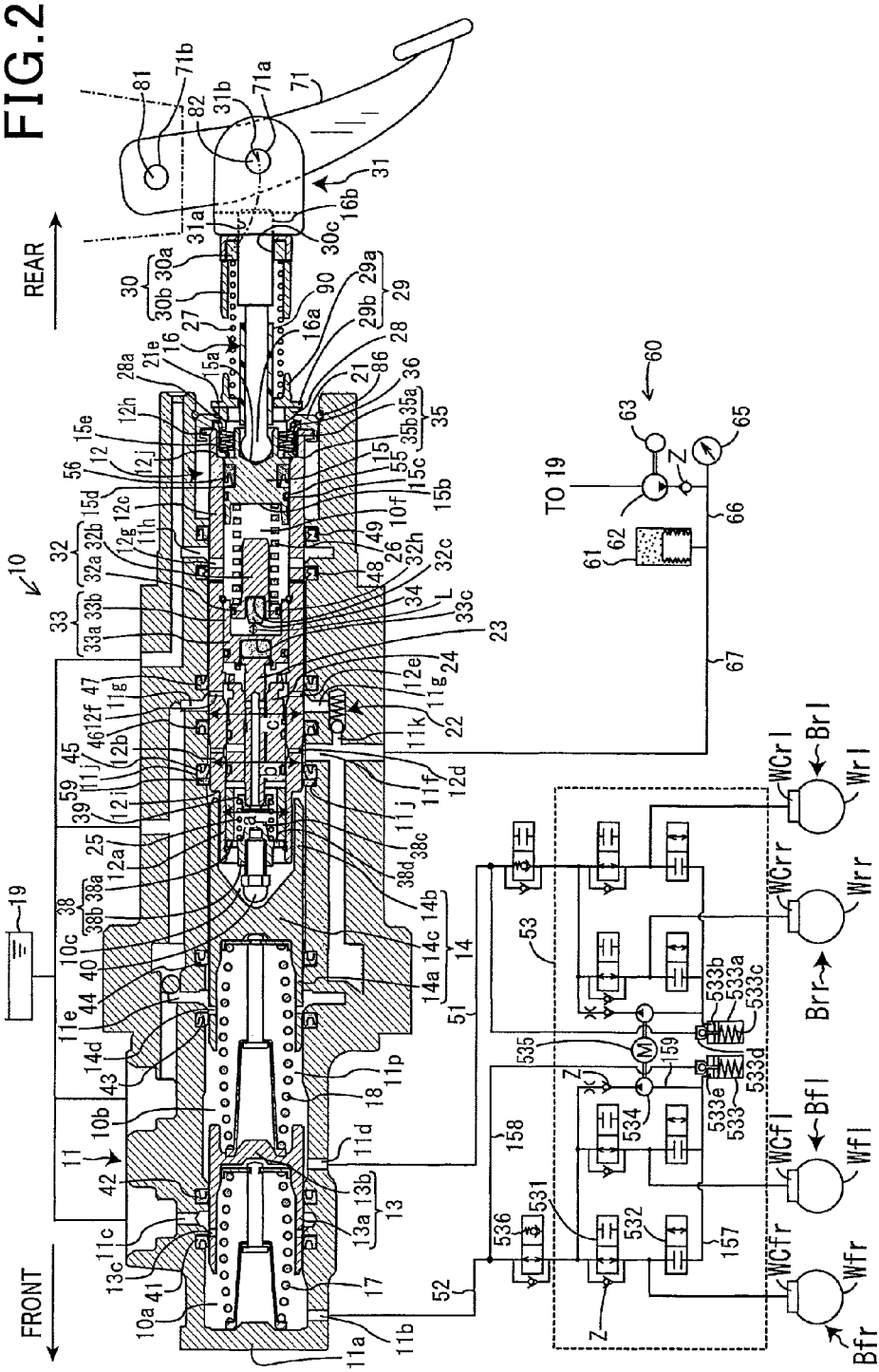

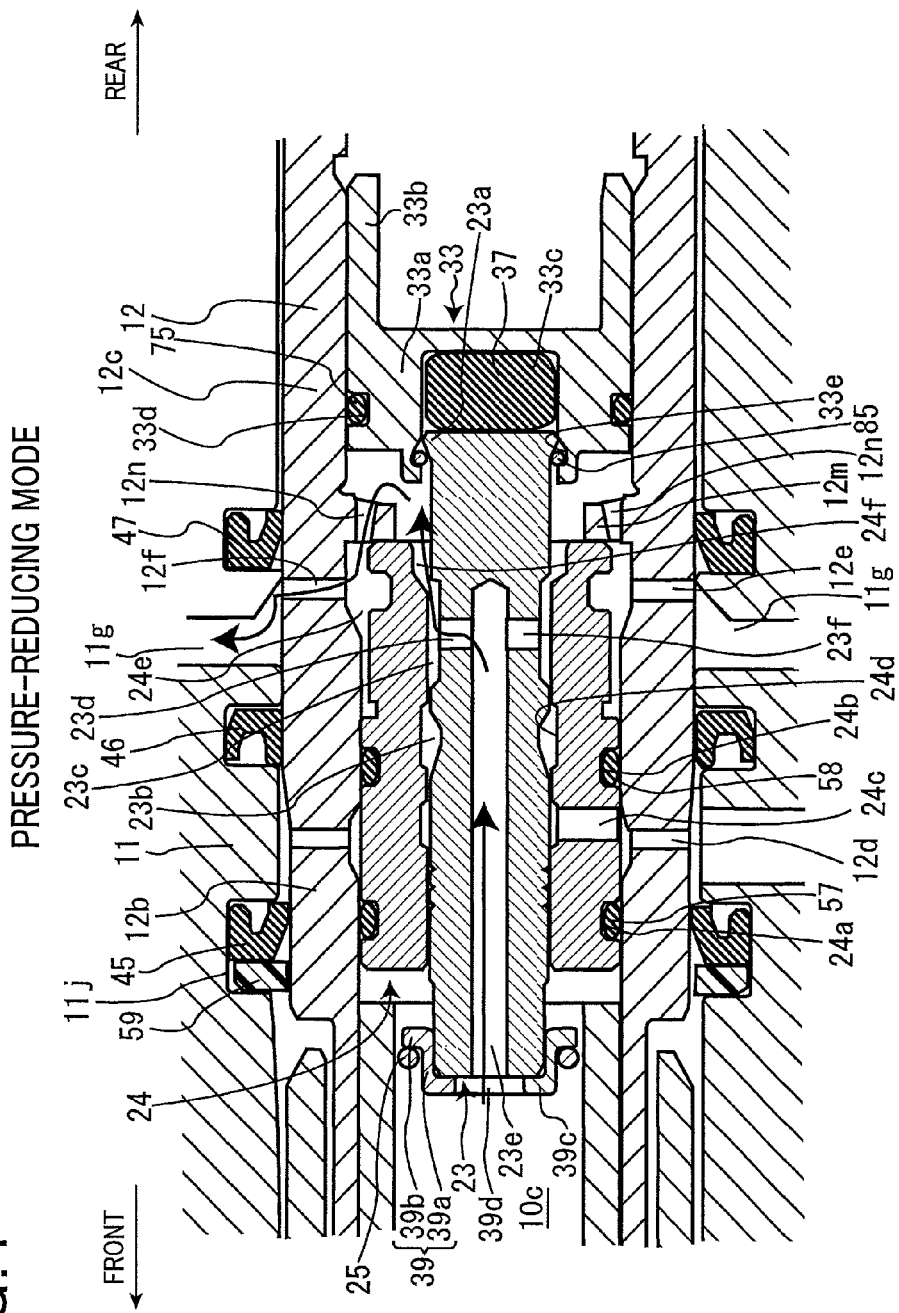

FIG.6 PRESSURE-INCREASING MODE

FIG.7 PRESSURE-HOLDING MODE

BRAKE SYSTEM FOR VEHICLE DESIGNED TO IMPROVE DURABILITY AND MANEUVERING FEELING

CROSS REFERENCE TO RELATED DOCUMENT

The present application claims the benefit of priority of Japanese Patent Application No. 2013-137328 filed on Jun. 28, 2013, the disclosure of which is incorporated herein by reference.

BACKGROUND OF THE INVENTION

1 Technical Field

This disclosure relates generally to a brake system for vehicles which works to control braking force applied to, for example, an automobile.

2 Background Art

EP2212170 A2 teaches an automotive brake system designed to control braking force applied to a vehicle. The brake system is equipped with a pedal simulator serving to simulate characteristics of a conventional boost system felt by a vehicle operator at a brake pedal and a hydraulic booster serving to boost pressure in an accumulator to produce pressure in a master cylinder which is to be applied to a friction brake as a function of an operation of the brake pedal.

The hydraulic booster and the pedal simulator are separate from each other, thus resulting in an increase in overall size of the brake system and a deterioration in mountability thereof in the vehicle. The brake system also encounters a drawback in that a transmission mechanism, such as an operating rod, through which an effort on a brake operating member is transmitted to an input piston of the master cylinder is subjected to a mechanical load upon movement of the brake operating member, which impinges on the durability and maneuvering feeling of the transmission mechanism.

SUMMARY

It is therefore an object to provide a brake system for vehicles which is easy to mount in the vehicle and designed to improve the durability and maneuvering feeling thereof.

According to one aspect of this disclosure, there is provided a braking device for a vehicle such as an automobile. The braking device comprises: (a) a master cylinder which has a given length with a front and a rear, the master cylinder having a cylindrical cavity extending in a longitudinal direction of the master cylinder; (b) an accumulator which connects with the cylindrical cavity of the master cylinder and in which brake fluid is stored under pressure; (c) a reservoir which connects with the cylindrical cavity of the master cylinder and in which the brake fluid is stored; (d) a master piston which is disposed in the cylindrical cavity to be slidable in a longitudinal direction thereof, the master piston having a front oriented to the front of the master cylinder and a rear oriented to the rear of the master cylinder, the master piston defining a master chamber and a servo chamber within the cylindrical cavity, the master chamber being formed on a front side of the master piston and storing therein the brake fluid to be delivered to a brake device working to apply a frictional braking force to a wheel of a vehicle, the servo chamber being formed on a rear side of the master piston; (e) a spool valve which is disposed on the rear side of the master piston within the cylindrical cavity of the master cylinder, the spool valve working to switch among a pressure-reducing mode, a pressure-increasing mode, and a pressure-holding mode, the pressure-reducing mode being to communicate between the servo chamber and the reservoir chamber, the pressure-increasing mode being to communicate between the servo chamber and the accumulator, the pressure-holding mode being to hermetically close the servo chamber; (f) a brake actuating member which is disposed behind the master cylinder and to which a braking effort, as produced by a driver of the vehicle, is transmitted; (g) an input piston which is disposed behind the spool valve to be slidable within the cylindrical cavity of the master cylinder, the input piston connecting with the brake actuating member and being moved in response to the braking effort transmitted from the brake actuating member to drive the spool valve; (h) a braking simulator member which is disposed in front of the input piston within the cylindrical cavity of the master cylinder, the braking simulator member working to urge the input piston rearward; (i) a fail-safe cylinder which is disposed behind the master piston to be slidable within the cylindrical cavity of the master cylinder, the fail-safe cylinder including a first cylindrical portion and a second cylindrical portion disposed behind the first cylindrical portion, the second cylindrical portion being greater in outer diameter than the first cylindrical portion; (j) a fail-safe spring which works to urge the fail-safe cylinder toward the front of the master cylinder; (k) an operating rod which transmits the braking effort from the brake actuating member to the input piston; (l) a first retainer which is of a hollow cylindrical shape and disposed around and away from an outer periphery of a front portion of the operating rod; (m) a second retainer which is of a hollow cylindrical shape and secured to an outer periphery of a rear portion of the operating rod; (n) a return spring which is disposed between the first and second retainers so as to urge the first retainer frontward and the second retainer rearward; (o) a stopper which is of a cylindrical shape and supports rear ends of the fail-safe spring and the fail-safe cylinder to stop the fail-safe cylinder from advancing over a given allowable range; and (p) a movable member which is disposed on a front end of the first retainer which faces the front of the master cylinder, the movable member having a front surface which is oriented to the front of the master cylinder and defines a pressing surface of a convex dome-shape.

The input piston is slidable in the fail-safe cylinder in a longitudinal direction thereof.

The master cylinder has a supply port which opens to an outer periphery of the first cylindrical portion and to which the brake fluid is supplied from the accumulator.

The master cylinder and the fail-safe cylinder have reservoir flow paths formed therein. The reservoir flow paths establish fluid communication between the reservoir and a fluid chamber that is a portion of the cylindrical cavity and defined in front of the input piston inside the fail-safe cylinder when the fail-safe cylinder is in a rearmost position in the given allowable range.

When the brake fluid is being supplied from the accumulator to the supply port, force, as developed by pressure of the brake fluid and a difference in traverse cross-section between the first cylindrical portion and the second cylindrical portion, presses the fail-safe cylinder rearward in the master cylinder to place the fail-safe cylinder at the rearmost position.

When the brake fluid is not being supplied from the accumulator to the supply port, the fail-safe cylinder is urged by the fail-safe spring frontward to block the reservoir flow path to hermetically close the fluid chamber defined ahead the input piston inside the fail-safe cylinder, thereby allowing the fail-safe cylinder to press the master piston in response to the braking effort transmitted to the input piston.

The stopper has a concave dome-shaped seat formed in a rear end thereof facing the rear of the master cylinder.

The pressing surface is placed in slidable contact with the seat of the stopper.

The braking simulator member which urges the input piston rearward to perform a braking simulating function of a brake simulator is disposed inside the master cylinder which constitutes a hydraulic booster. In other words, the brake simulator is installed in the hydraulic booster, thus resulting in improved mountability of the braking device in the vehicle. The pressing surface is placed in slidable contact with the seat of the stopper, so that the movable member is slidable relative to the stopper. This permits the movable member and the first retainer to move relative to the master cylinder in response to the braking effort on the brake actuating member, thereby absorbing an undesirable load on the braking device and also ensuring the stability in operating the brake actuating member. The above described structure of the braking device improves the durability and operability thereof.

In the preferred mode of an embodiment, the movable member and the first retainer are made of separate parts and designed to be slidable on one another in a direction perpendicular to an axial direction thereof.

The braking device may also include a backlash eliminator which is disposed on the outer periphery of the front portion of the operating rod and works to minimize backlash between the first retainer and the operating rod.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 2 is a partially longitudinal sectional view which illustrates the braking device of FIG. 1;

FIG. 4 is an enlarged view of a spool piston and a spool cylinder of a hydraulic booster of the braking device of FIG. 2 in a pressure-reducing mode;

DESCRIPTION OF THE PREFERRED EMBODIMENTS

Figure 1:
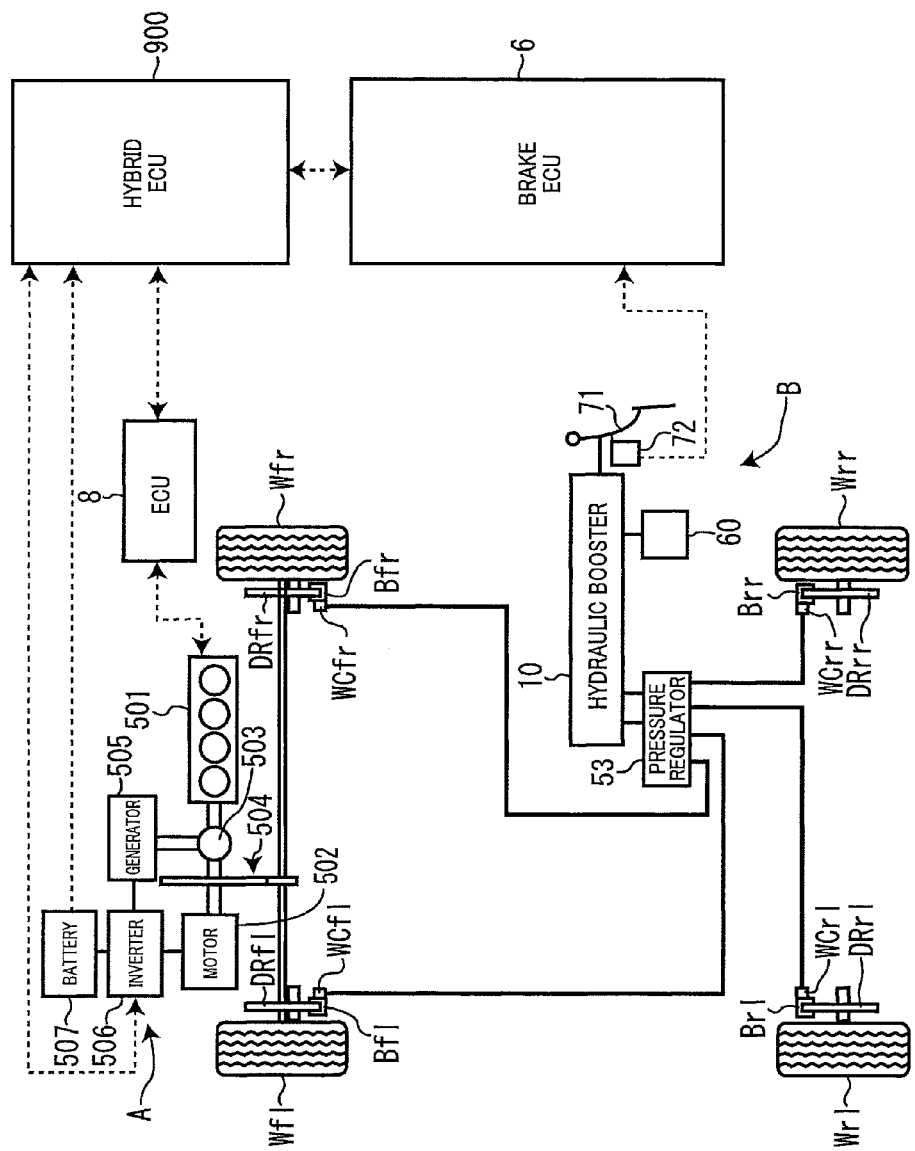
FIG. 1 is a block diagram which illustrates a hybrid vehicle in which a braking device according to an embodiment is mounted.

Referring to the drawings, wherein like reference numbers refer to like parts in several views, particularly to FIG. 1, there is shown a brake system B for vehicles such as automobiles according to an embodiment. The brake system B, as referred to herein, is engineered as a friction brake unit mounted in a hybrid vehicle. The hybrid vehicle is equipped with a hybrid system to drive wheels, for example, front left and right wheels Wfl and Wfr. The hybrid vehicle also includes a brake ECU (Electronic Control Unit) 6, an engine ECU (Electronic Control Unit) 8, a hybrid ECU (Electronic Control Unit) 900, a hydraulic booster 10, a pressure regulator 53, a hydraulic pressure generator 60, a brake pedal (i.e., a brake actuating member) 71, a brake sensor 72, an internal combustion engine 501, an electric motor 502, a power split device 503, a power transmission device 504, an inverter 506, and a storage battery 507.

The output power of the engine 501 is transmitted to the driven wheels through the power split device 503 and the power transmission device 504. The output power of the motor 502 is also transmitted to the driven wheels through the power transmission device 504.

The inverter 506 works to achieve conversion of voltage between the motor 502 or an electric generator 505 and the battery 507. The engine ECU 8 works to receives instructions from the hybrid ECU 900 to control the power, as outputted from the engine 501. The hybrid ECU 900 serves to control operations of the motor 502 and the generator 505 through the inverter 506. The hybrid ECU 900 is connected to the battery 507 and monitors the state of charge (SOC) of and current charged in the battery 507.

A combination of the generator 505, the inverter 506, and the battery 507 makes a regenerative braking system A. The regenerative braking system A works to make the wheel Wfl and Wfr produce a regenerative braking force as a function of an actually producible regenerative braking force, which will be described later in detail. The motor 502 and the generator 505 are illustrated in FIG. 1 as being separate parts, but their operations may be achieved by a single motor/generator.

Friction braking devices Bfl, Bfr, Brl, and Brr are disposed near the wheels Wfl, Wfr, Wrl, and Wrr of the vehicle. The friction braking device Bfl includes a brake disc DRfl and a brake pad (not shown). The brake disc DRfl rotates along with the wheel Wfl. The brake pad is of a typical type and pressed against the brake disc DRfl to produce a friction braking power. Similarly, the friction braking devices Bfr, Brl, and Brr are made up of brake discs DRfl, DRfr, DRrl, and DRrr and brake pads (not shown), respectively, and identical in operation and structure with the friction braking device Bfl. The explanation thereof in detail will be omitted here. The friction braking devices Bfl, Bfr, Brl, and Brr also include wheel cylinders WCfl, WCfr, WCrl, and WCrr, respectively, which are responsive to a master pressure (which is also called master cylinder pressure) that is hydraulic pressure, as developed by the hydraulic booster 10, required to press the brake pads against the brake discs DRfl, DRfr, DRrl, and DRrr, respectively.

The brake sensor 72 measures the amount of stroke, or position of the brake pedal 71 depressed by the vehicle operator or driver and outputs a signal indicative thereof to the brake ECU 6. The brake ECU 6 calculates a braking force, as required by the vehicle driver, as a function of the signal outputted from the brake sensor 72. The brake ECU 6 calculates a target regenerative braking force as a function of the required braking force and outputs a signal indicative of the target regenerative braking force to the hybrid ECU 900. The hybrid ECU 900 calculates the actually producible regenerative braking force as a function of the target regenerative braking force and outputs a signal indicative thereof to the brake ECU 6.

Hydraulic Pressure Generator

The structure and operation of the hydraulic pressure generator 60 will be described in detail with reference to FIG. 2. The hydraulic pressure generator 60 works to produce an accumulator pressure and includes an accumulator 61, a hydraulic pressure pump 62, and a pressure sensor 65.

The accumulator 61 stores therein brake fluid under pressure. Specifically, the accumulator 61 stores accumulator pressure that is the hydraulic pressure of the brake fluid, as created by the hydraulic pressure pump 62. The accumulator 61 connects with the pressure sensor 65 and the hydraulic pressure pump 62 through a pipe 66. The hydraulic pressure pump 62 connects with a reservoir 19. The hydraulic pressure pump 62 is driven by an electric motor 63 to deliver the brake fluid from the reservoir 19 to the accumulator 61.

The pressure sensor 65 works to measure the accumulator pressure that is the pressure in the accumulator 61. When the accumulator pressure is determined through the pressure sensor 65 to have dropped below a given value, the brake ECU 6 outputs a control signal to actuate the motor 63.

Hydraulic Booster

The structure and operation of the hydraulic booster 10 will be described below with reference to FIG. 2. The hydraulic booster 10 works to regulate the accumulator pressure, as developed by the hydraulic pressure generator 60, as a function of the stroke of (i.e., a driver's effort on) the brake pedal 71 to produce a servo pressure which is, in turn, used to generate the master pressure.

The hydraulic booster 10 includes a master cylinder 11, a fail-safe cylinder 12, a first master piston 13, a second master piston 14, an input piston 15, an operating rod 16, a first return spring 17, a second return spring 18, a reservoir 19, a stopper 21, a mechanical relief valve 22, a spool piston 23, a spool cylinder 24, a spool spring 25, a simulator spring 26, a pedal return spring 27, a movable member 28, a first spring retainer 29, a second spring retainer 30, a connecting member 31, a movable member 32, a retaining piston 33, a simulator rubber 34 serving as a cushion, a spring retainer 35, a fail-safe spring 36, a damper 37, a first spool spring retainer 38, a second spring retainer 39, a pushing member 40, and sealing members 41 to 49.

In the following discussion, a part of the hydraulic booster 10 where the first master piston 13 is disposed will be referred to as the front of the hydraulic booster 10, while a part of the hydraulic booster 10 where the operating rod 16 is disposed will be referred to as the rear of the hydraulic booster 10. An axial direction (i.e., a lengthwise direction) of the hydraulic booster 10, thus, represents a front-back direction of the hydraulic booster 10.

The master cylinder 11 is of a hollow cylindrical shape which has a bottom 11a on the front of the hydraulic booster 10 and an opening defining the rear of the hydraulic booster 10. The master cylinder 11 has a given length aligned with the length of the hydraulic booster 10, a front end (i.e. the bottom 11a), and a rear end (i.e., the opening) at the rear of the hydraulic booster 10. The master cylinder 11 also has a cylindrical cavity 11p extending in the lengthwise or longitudinal direction thereof. The master cylinder 11 is installed in the vehicle. The master cylinder 11 has a first port 11b, a second port 11c, a third port 11d, a fourth port 11e, a fifth port 11f (i.e., a supply port), a sixth port 11g, and a seventh port 11h all of which communicate with the cylindrical cavity 11p and which are arranged in that order from the front to the rear of the master cylinder 11. The second port 11c, the fourth port 11e, the sixth port 11g, and the seventh port 11h connect with the reservoir 19 in which the brake fluid is stored. The reservoir 19, thus, communicates with the cylindrical cavity 11p of the master cylinder 11.

The sealing members 41 and 42 are disposed in annular grooves formed in an inner peripheral wall of the master cylinder 11 across the second port 11c. The sealing members 41 and 42 are in hermetic contact with an entire outer circumference of the first master piston 13. Similarly, the sealing members 43 and 44 are disposed in annular grooves formed in the inner peripheral wall of the master cylinder 11 across the fourth port 11e. The sealing members 43 and 44 are in hermetic contact with an entire outer circumference of the second master piston 14.

The sealing members 45 and 46 are disposed in annular grooves formed in the inner peripheral wall of the master cylinder 11 across the fifth port 11f. The sealing members 45 and 46 are in hermetic contact with entire outer circumferences of a first cylindrical portion 12b and a second cylindrical portion 12c of the fail-safe cylinder 12, as will be described later in detail. The sealing member 47 is disposed in an annular groove formed in the inner peripheral wall of the master cylinder 11 behind the sealing member 46 in hermetic contact with the entire outer circumference of the second cylindrical portion 12c. Similarly, the sealing members 48 and 49 are disposed in annular grooves formed in the inner peripheral wall of the master cylinder 11 across the seventh port 11h. The sealing members 48 and 49 are in hermetic contact with the entire outer circumference of the second cylindrical portion 12c of the fail-safe cylinder 12.

Figure 3A:
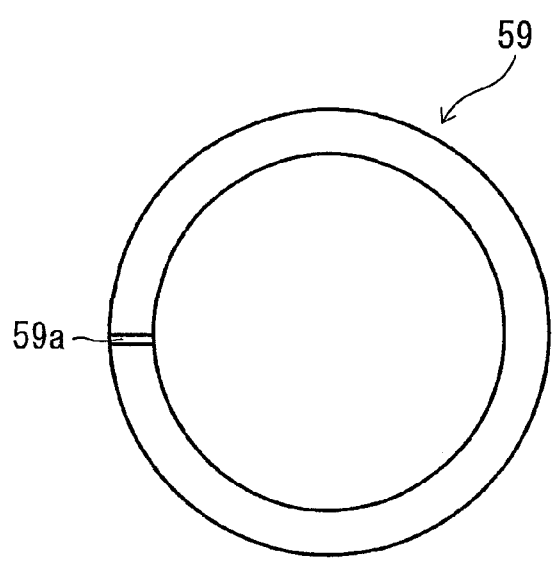
FIG. 3(a) is a front view of a support member installed in a hydraulic booster of the braking device of FIG. 2.
Figure 3B:
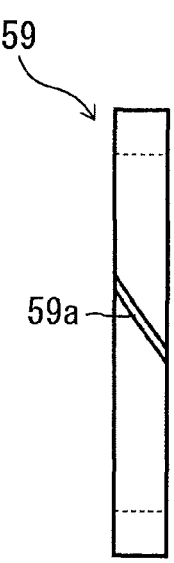
FIG. 3(b) is a side view of FIG. 3(a)

A support member 59 is disposed on the front surface of the sealing member 45. The sealing member 45 and the support member 59 are installed in a common retaining groove 11j formed in the inner wall of the master cylinder 11. The sealing member 45 and the support member 59 are, as clearly illustrated in FIG. 4, placed in abutment contact with each other. The support member 59 is, as illustrated in FIGS. 3(a) and 3(b), of a ring shape and has a slit 59a formed therein. The support member 59 is made of elastic material such as resin and has an inner peripheral surface in contact with the outer circumferential surface of the first cylindrical portion 12b of the fail-safe cylinder 12 which will be described later in detail.

Referring back to FIG. 2, the fifth port 11f works as a supply port establishes a fluid communication between the outer periphery of the master cylinder 11 and the cylindrical cavity 11p. The fifth port 11f connects with the accumulator 61 through a pipe 67. In other words, the accumulator 61 communicates with the cylindrical cavity 11p of the master cylinder 11, so that the accumulator pressure is supplied to the fifth port 11f.

The fifth port 11f and the sixth port 11g communicate with each other through a connecting fluid path 11k in which a mechanical relief valve 22 is mounted. The mechanical relief valve 22 works to block a flow of the brake fluid from the sixth port 11g to the fifth port 11f and allow a flow of the brake fluid from the fifth port 11f to the sixth port 11g when the pressure in the fifth port 11f rises above a given level.

An assembly of the first master piston 13 and the second master piston 14 serves as a master piston of the brake system B. The first master piston 13 is disposed in a front portion of the cylindrical cavity 11p of the master cylinder 11, that is, located behind the bottom 11a, so that it is slidable in the longitudinal direction of the cylindrical cavity 11p. The first master piston 13 is of a bottomed cylindrical shape and made up of a hollow cylindrical portion 13a and a cup-shaped retaining portion 13b extending behind the cylindrical portion 13a. The retaining portion 13b is fluidly isolated from the cylindrical portion 13a. The cylindrical portion 13a has fluid holes 13c formed therein. The cylindrical cavity 11p includes a first master chamber 10a located in front of the retaining portion 13b. Specifically, the first master cylinder 10a is defined by the inner wall of the master cylinder 11, the cylindrical portion 13a, and the retaining portion 13b. The first port 11b communicates with the first master chamber 10a. The first master chamber 10a is filled with the brake fluid which is supplied to the wheel cylinders WCfl, WCfr, WCrl, and WCrr.

The first return spring 17 is disposed between the bottom 11a of the master cylinder 11 and the retaining portion of the first master piston 13. The first return spring 17 urges the first master piston 13 backward to place the first master piston 13 at an initial position, as illustrated in FIG. 2, unless the brake pedal 71 is depressed by the vehicle driver.

When the first master piston 13 is in the initial position, the second port 11c coincides or communicates with the fluid holes 13c, so that the reservoir 19 communicates with the first master chamber 10a. This causes the brake fluid to be delivered from the reservoir 19 to the first master chamber 10a. An excess of the brake fluid in the first master chamber 10a is returned back to the reservoir 19. When the first master piston 13 travels frontward from the initial position, it will cause the second port 11c to be blocked by the cylindrical portion 13a, so that the first master chamber 10a is closed hermetically to create the master pressure therein.

The second master piston 14 is disposed in a rear portion of the cylindrical cavity 11p of the master cylinder 11, that is, located behind the first master piston 13, so that it is slidable in the longitudinal direction of the cylindrical cavity 11p. The second master piston 14 is made up of a first cylindrical portion 14a, a second cylindrical portion 14b lying behind the first cylindrical portion 14a, and a retaining portion 14c formed between the first and second cylindrical portions 14a and 14b. The retaining portion 14c fluidly isolates the first and second cylindrical portions 14a and 14b from each other. The first cylindrical portion 14a has fluid holes 14d formed therein.

The cylindrical cavity 11p includes a second master chamber 10b located in front of the retaining portion 14b. Specifically, the second master cylinder 10b is defined by the inner wall of the master cylinder 11, the first cylindrical portion 14a, and the retaining portion 14c. The third port 11d communicates with the second master chamber 10b. The second master chamber 10b is filled with the brake fluid which is supplied to the wheel cylinders WCfl, WCfr, WCrl, and WCrr. The second master chamber 10b defines a master chamber within the cylindrical cavity 11p along with the first master chamber 10a.

The second return spring 18 is disposed between the retaining portion 13 of the first master piston 13 and the retaining portion 14c of the second master piston 14. The second return spring 18 is greater in set load than the first return spring 17. The second return spring 18 urges the second master piston 14 backward to place the second master piston 14 at an initial position, as illustrated in FIG. 2, unless the brake pedal 71 is depressed by the vehicle driver.

When the second master piston 14 is in the initial position, the fourth port 11e coincides or communicates with the fluid holes 14d, so that the reservoir 19 communicates with the second master chamber 10b. This causes the brake fluid to be delivered from the reservoir 19 to the second master chamber 10b. An excess of the brake fluid in the second master chamber 10b is returned back to the reservoir 19. When the second master piston 14 travels frontward from the initial position, it will cause the fourth port 11e to be blocked by the cylindrical portion 14a, so that the second master chamber 10b is closed hermetically to create the master pressure therein.

The fail-safe cylinder 12 is disposed behind the second master piston 14 within the cylindrical cavity 11p of the master cylinder 11 to be slidable in the longitudinal direction of the cylindrical cavity 11p. The fail-safe cylinder 12 is made up of the front cylindrical portion 12a, the first cylindrical portion 12b, and the second cylindrical portion 12c which are aligned with each other in the lengthwise direction thereof. The front cylindrical portion 12a, the first cylindrical portion 12b, and the second cylindrical portion 12c are formed integrally with each other and all of a hollow cylindrical shape. The front cylindrical portion 12a has an outer diameter a. The first cylindrical portion 12b has an outer diameter b which is greater than the outer diameter a of the front cylindrical portion 12a. The second cylindrical portion 12c has an outer diameter c which is greater than the outer diameter b of the first cylindrical portion 12b. The fail-safe cylinder 12 has an outer shoulder formed between the front cylindrical portion 12a and the first cylindrical portion 12b to define a pressing surface 12i.

The second cylindrical portion 12c has a flange 12h extending outward from a rear end thereof. The flange 12h contacts with the stopper 21 to stop the fail-safe cylinder 12 from moving outside the master cylinder 11. The second cylindrical portion 12c has a rear end formed to be greater in inner diameter than another portion thereof to define an inner shoulder 12j.

The front cylindrical portion 12a is disposed inside the second cylindrical portion 14b of the second master piston 14. The first cylindrical portion 12b has first inner ports 12d formed in a rear portion thereof. The first inner ports 12d communicate between the outer peripheral surface and the inner peripheral surface of the first cylindrical portion 12b, in other words, passes through the thickness of the first cylindrical portion 12b. The second cylindrical portion 12c has formed in a front portion thereof a second inner port 12e and a third inner port 12f which extend through the thickness of the second cylindrical portion 12c. The second cylindrical portion 12c also has fourth inner ports 12g formed in a middle portion thereof. The fourth inner ports 12g extend through the thickness of the second cylindrical portion 12c and opens toward the front end (i.e., the head) of the input piston 15 disposed within the fail-safe cylinder 12.

The second cylindrical portion 12c, as illustrated in FIG. 4, has a stopper 12m formed on a front inner peripheral wall thereof. The stopper 12m has formed therein fluid flow paths 12n extending in the longitudinal direction of the second cylindrical portion 12c.

The input piston 15 is, as clearly illustrated in FIG. 2, located behind the spool cylinder 24 and the spool piston 23, which will be described later in detail, to be slidable in the longitudinal direction thereof within a rear portion of the second cylindrical portion 12c of the fail-safe cylinder 12 (i.e., the cylindrical cavity 11p). The input piston 15 is made of a cylindrical member and substantially circular in cross section thereof. The input piston 15 has a rod-retaining chamber 15a formed in a rear end thereof. The rod-retaining chamber 15a has a conical bottom. The input piston 15 also has a spring-retaining chamber 15b formed in a front end thereof. The input piston 15 has an outer shoulder 15e to have a small-diameter rear portion which is smaller in outer diameter than a major portion thereof.

The input piston 15 has seal retaining grooves (i.e., recesses) 15c and 15d formed in an outer periphery thereof. Sealing members 55 and 56 are disposed in the seal retaining grooves 15c and 15d in hermetical contact with an entire inner circumference of the second cylindrical portion 12c of the fail-safe cylinder 12.

The input piston 15 is coupled with the brake pedal 71 through the operating rod 16 and a connecting member 31, so that the effort acting on the brake pedal 71 is transmitted to the input piston 15. The input piston 15 works to transmit the effort, as exerted thereon, to the spool piston 23 through the simulator spring 26, the movable member 32, the simulator rubber 34, the retaining piston 33, and the damper 37, so that the spool piston 23 travels in the longitudinal direction thereof.

Structure of Rear of Hydraulic Booster

Figure 9:
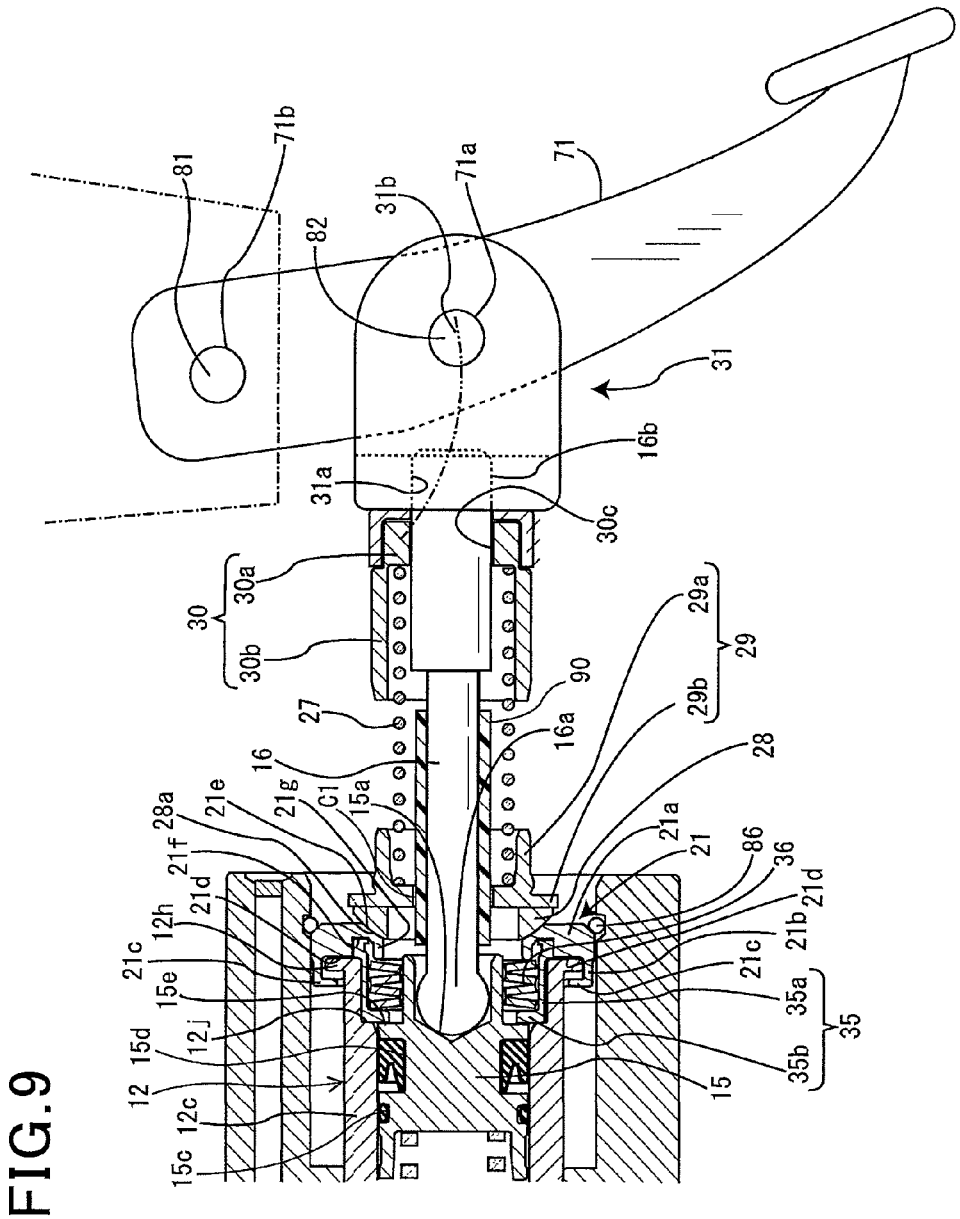
FIG. 9 is a partially enlarged view of a rear portion of a hydraulic booster of the braking device of FIG. 2.

Referring to FIG. 9, the spring retainer 35 is made up of a hollow cylinder 35a and a ring-shaped support 35b extending inwardly from a front edge of the hollow cylinder 35a. The spring retainer 35 is fit in the rear end of the second cylindrical portion 12c with the support 35b having the front surface thereof placed in contact with the shoulder 15e of the input piston 15.

The stopper 21 is attached to the inner wall of the rear end of the master cylinder 11 to be movable. The stopper 21 is designed as a stopper plate and made up of a ring-shaped base 21a, a hollow cylinder 21b, and a stopper ring 21c. The hollow cylinder 21b extends forward from the front end of the base 21a. The stopper ring 21c extends inwardly from the front end of the hollow cylinder 21b.

The base 21a has a front surface 21d which lies inside the hollow cylinder 21b as a support surface with which the rear end (i.e., the flange 12h) of the fail-safe cylinder 12 is placed in contact. The flange 12h will also be referred to as a contact portion below. The stopper 21 also includes a ring-shaped retaining recess 21f formed in the front surface of the base 21a inside the support surface 21d in the shape of a groove. Within the retaining recess 21f, the rear end of the cylinder 35a of the spring retainer 35 is fit. The stopper 21 further includes a ring-shaped protrusion 21g extending from the front of the base 21a inside the retaining recess 21f.

The base 21a has a domed recess 21e formed on a central area of the rear end thereof. The recess 21e serves as a seat and is of an arc or circular shape in cross section. The recess 21e will also be referred to as a seat below. The master cylinder 11 has a C-ring 86 fit in a groove formed in the inner wall of the open rear end thereof. The C-ring 86 works as a stopper to hold the stopper 21 from being removed from the master cylinder 11.

The movable member 28 is used as a spacer and made of a ring-shaped member. The movable member 28 has a front surface which is oriented toward the front of the master cylinder 11 and defines a convex or dome-shaped pressing surface 28a. The pressure surface 28a is of an arc or circular shape in cross section. The pressing surface 28a is contoured to conform with the shape of the seat 21e. The movable member 28 is disposed on the front end of the first spring retainer 29 which faces the front of the master cylinder 11. The movable member 28 is also arranged behind the stopper 21 with the pressing surface 28a being placed in slidable contact with the seat 21e. The movable member 28 is movable or slidable on the stopper 21 (i.e., the seat 21e).

The fail-safe spring 36 is disposed between the support 35b of the spring retainer 35 and the protrusion 21g of the stopper 21 within the cylinder 35a of the spring retainer 35. The fail-safe spring 36 is made up of a plurality of diaphragm springs and works to urge the fail-safe cylinder 12 forward against the master cylinder 11.

The first spring retainer 29 (which will also be referred to as a first retainer below) is made up of a hollow cylinder 29a and a flange 29b extending from the front end of the hollow cylinder 29a inwardly and outwardly. The first spring retainer 29 serves as a spring holder. The first spring 29 is arranged behind the movable member 28 with the flange 29b placed in abutment contact with the rear end of the movable member 28.

The operating rod 16 has a pressing ball 16a formed on the front end thereof and a screw 16b formed on the rear end thereof. The operating rod 16 is joined to the rear end of the input piston 15 with the pressing ball 16a fit in the rod-retaining chamber 15a. The operating rod 16 has a given length extending in the longitudinal direction of the hydraulic booster 10. Specifically, the operating rod 16 has the length aligned with the length of the hydraulic booster 10. The operating rod 16 passes through the movable member 28 and the first spring retainer 29.

The second spring retainer 30 (which will also be referred to as a second retainer below) is disposed behind the first spring retainer 29 in alignment therewith and secured to the rear portion of the operating rod 16. The second spring retainer 30 is of a hollow cylindrical shape and made up of an annular bottom 30a and a cylinder 30b extending from the bottom 30a frontward. The bottom 30a has a threaded hole 30c into which the screw 16b of the operating rod 16 is fastened.

The pedal return spring 27 is disposed between the flange 29b of the first spring retainer 29 and the bottom 30a of the second spring retainer 30. The pedal return spring 27 is held inside the cylinder 29a of the first spring retainer 29 and the cylinder 30b of the second spring retainer 30. The pedal return spring 27 works to urge the pressing surface 28a of the movable member 28 against the seat 21e of the stopper 21 through the first spring retainer 29.

The connecting member 31 has a threaded hole 31a formed in the front end thereof. The screw 16b of the operating rod 16 is fastened into the threaded hole 31a to join the connecting member 31 to the rear end of the operating rod 16. The bottom 30a of the second spring retainer 30 is in contact with the front end of the connecting member 31. The connecting member 31 has an axial through hole 31b formed in substantially the center thereof in the longitudinal direction of the hydraulic booster 10. The threaded hole 30c of the second spring retainer 30 and the threaded hole 31a of the connecting member 31 are in engagement with the screw 16b of the operating rod 16, thereby enabling the connecting member 31 to be regulated in position thereof relative to the operating rod 16 in the longitudinal direction of the operating rod 16.

The brake pedal 71 is made of a lever on which an effort is exerted by the driver of the vehicle. The brake pedal 71 has an axial hole 71a formed in the center thereof and a mount hole 71b formed in an upper portion thereof. A bolt 81 is inserted into the mount hole 71b to secure the brake pedal 71 to a mount base of the vehicle, as indicated by a broken line in FIG. 2. The brake pedal 71 is swingable about the bolt 81. A connecting pin 82 is inserted into the axial hole 71a of the brake pedal 71 and the axial hole 31b of the connecting member 31, so that the swinging motion of the brake pedal 71 is converted into linear motion of the connecting member 31.

The pedal return spring 27 urges the second spring retainer 30 and the connecting member 31 backward to keep the brake pedal at the initial position, as illustrated in FIG. 2. The depression of the brake pedal 71 will cause the brake pedal 71 to swing about the mount hole 71b (i.e., the bolt 81) and also cause the axial holes 71a and 31b to swing about the mount hole 71b. A two-dot chain line in FIG. 2 indicates a path of travel of the axial holes 71a and 31b. Specifically, when the brake pedal 71 is depressed, the axial holes 71a and 31b move upward along the two-dot chain line. This movement causes the movable member 28 and the first spring retainer 29 to swing or slide on the stopper 21 to prevent an excessive pressure (i.e., shearing force) from acting on the pedal return spring 27.

The operating rod 16, as described above, has formed on the front end thereof the pressing ball 16a which is greater in diameter than a central major part of the operating rod 16. The inner diameter of the first spring retainer 29 (i.e., the flange 29b) is set greater than the outer diameter of the pressing ball 16a.

The brake system B of this embodiment is, thus, equipped with a cylindrical collar 90 partially disposed in a clearance C1 between the operating rod 16 and the first spring retainer 29. The collar 90 is in direct contact with an outer peripheral surface of the operating rod 16 (i.e., the outer periphery of at least a front portion of the operating rod 16 lying inside the first spring retainer 29 in a radial direction thereof). The collar 90 works as a backlash eliminator and has a slit (not shown) to be of a substantially C-shape in traverse cross section. The collar 90 is made of an elastically deformable resin material. The attachment of the collar 90 to the operating rod 16 is achieved by widening the slit of the collar 90 to increase the inner diameter thereof, and fitting it on the periphery of the operating rod 16. The collar 90 occupies the clearance C1 between the inner surface of the flange 29b of the first spring retainer 29 and the outer periphery of the operating rod 16 to eliminate backlash or play between the operating rod 16 and the first spring retainer 29.

The first spring retainer 29 and the movable member 28 are made of separate or individual parts and have end surfaces which extend perpendicular to the axes thereof and are placed in direct contact with each other, so that the first spring retainer 29 and the movable member 28 are slidable on one another in the direction perpendicular to the axes (i.e., the radial direction) thereof. Specifically, when mechanical load acts on the operating rod 16 which results in a misalignment between the longitudinal center lines (i.e. axes) of the first spring retainer 29 and the operating rod 16, it will cause the first spring retainer 29 to slide on the movable member 28 in the radial direction thereof to absorb or eliminate such a misalignment.

As apparent from the above discussion, the brake system B of this embodiment is equipped with the operating rod 16, the first spring retainer 27, the second spring retainer 30, the return spring 29, the stopper 21, the movable member 29, and the collar 90. The operating rod 16 works as a braking effort transmission mechanism to transmit the driver's effort on the brake pedal 71 to the input piston 15. The first spring retainer 29 is of a cylindrical shape and arranged around the outer periphery of the front portion of the operating rod 16 through a given air gap. The second spring retainer 30 is of a cylindrical shape and disposed around the outer periphery of the rear portion of the operating rod 16. The return spring 27 is installed between the first and second spring retainers 29 and 30 and exerts the pressure on the first and second spring retainers 29 and 30 so as to urge the second spring retainer 30 away from the first spring retainer 29, thereby keeping the operating rod 16 at the initial position. The stopper 21 is of a cylindrical shape and supports the rear ends of the fail-safe spring 36 and the fail-safe cylinder 12 to prevent the fail-safe cylinder 12 from advancing over a given distance (i.e., a preselected allowable range). The movable member 29 is of a cylindrical shape and disposed on the front end of the first spring retainer 29. The movable member 29 has a convex head with the pressing surface 28a. The stopper 21 has a concave rear end (i.e., the recessed seat 21e) with which the pressing surface 28a of the movable member 29 is in slidable contact. The drawings omit a boot (i.e., a cover) disposed over the outer periphery of the operating rod 16 and are merely schematic views which do not necessarily illustrate dimensions of parts of the brake system B precisely.

The retaining piston 33 is, as clearly illustrated in FIG. 2, disposed inside the front portion of the second cylindrical portion 12c of the fail-safe cylinder 12 (i.e., within the cylindrical cavity 11p of the master cylinder 11) to be slidable in the longitudinal direction thereof. The retaining piston 33 is made of a bottomed cylindrical member and includes a front end defining a bottom 33a and a cylinder 33b extending rearward from the bottom 33a. The bottom 33a has formed in the front end thereof a concave recess 33c serving as a retaining cavity. The bottom 33a has a C-ring groove 33e formed in an entire inner circumference of a front portion of the retaining cavity 33c. The bottom 33a also has a seal-retaining groove 33d formed on the outer circumference thereof. A seal 75 is fit in the seal-retaining groove 33d in contact with an entire inner circumference of the second cylindrical portion 12c of the fail-safe cylinder 12.

The movable member 32 is, as illustrated in FIG. 2, disposed inside the rear portion of the second cylindrical portion 12c of the fail-safe cylinder 12 (i.e., within the cylindrical cavity 11p of the master cylinder 11) to be slidable in the longitudinal direction thereof. The movable member 32 is made up of a flange 32a formed on the front end thereof and a shaft 32b extending backward from the flange 32a in the longitudinal direction of the hydraulic booster 10.

The flange 32a has a rubber-retaining chamber 32c formed in the front end thereof in the shape of a concave recess. In the rubber-retaining chamber 32c, the cylindrical simulator rubber 34 is fit which protrudes outside the front end of the rubber-retaining chamber 32c. When placed at an initial position, as illustrated in FIG. 2, the simulator rubber (i.e., the movable member 32) is located away from the retaining piston 33.

The flange 32a has formed therein a fluid path 32h which communicates between a cavity, as defined between the front end of the flange 32a and the inner wall of the retaining piston 33, and a major part of a simulator chamber 10f, which will be described later in detail. When the movable member 32 moves relative to the retaining piston 33, it will cause the brake fluid to flow from the cavity to the simulator chamber 10f or vice versa, thereby facilitating the sliding movement of the movable member 32 towards or away from the retaining piston 33.

The simulator chamber 10f is defined by the inner wall of the second cylindrical portion 12c of the fail-safe cylinder 12, the rear end of the retaining piston 33, and the front end of the input piston 15. The simulator chamber 10f is filled with the brake fluid. The simulator rubber 34 is, as described above, separate from the retaining piston 33, thereby allowing the simulator rubber 34 to experience a stroke L (will also be referred to as a loss stroke) within the simulator chamber 10f.

The simulator spring 26 is a braking simulator member engineered as a braking operation simulator and disposed between the flange 32a of the movable member 32 and the spring-retaining chamber 15b of the input piston 15 within the simulator chamber 10f. In other words, the simulator spring 26 is located ahead of the input piston 15 within the second cylindrical portion 12c of the fail-safe cylinder 12 (i.e., the cylindrical cavity 11p of the master cylinder 11). The shaft 32b of the movable member 32 is inserted into the simulator spring 26 to retain the simulator spring 26. The simulator spring 26 has a front portion press-fit on the shaft 32b of the movable member 32. With these arrangements, when the input piston 15 advances further from where the simulator rubber 34 (i.e., the movable member 32) hits the retaining piston 33, it will cause the simulator spring 26 to urge the input piston 15 backward.

The first inner ports 12d open at the outer periphery of the first cylindrical portion 12b of the fail-safe cylinder 12. The second cylindrical portion 12c is, as described above, shaped to have the outer diameter c greater than the outer diameter b of the first cylindrical portion 12b. Accordingly, the exertion of the accumulator pressure on the fifth port 11f (i.e., when the brake fluid is being supplied from the accumulator 61 to the fifth port 11f) will cause force or hydraulic pressure, as created by the accumulator pressure (i.e., the pressure of the brake fluid delivered from the accumulator 61) and a difference in traverse cross-section between the first cylindrical portion 12b and the second cylindrical portion 12c, to press the fail-safe cylinder 12 rearward against the stopper 21, thereby placing the fail-safe cylinder 12 at a rearmost position (i.e., the initial position) of the above describe preselected allowable range.

When the fail-safe cylinder 12 is in the initial position, the fourth inner ports 12g communicate with the seventh port 11h of the master cylinder 11. Specifically, the hydraulic communication between the simulator chamber 10f and the reservoir 19 is established by a reservoir flow path, as defined by the fourth inner ports 12g and the seventh port 11h. The simulator chamber 10f is a portion of the cylindrical cavity 11p, as defined ahead the input piston 15 inside the fail-safe cylinder 12. A change in volume of the simulator chamber 10f arising from the longitudinal sliding movement of the input piston 15 causes the brake fluid within the simulator chamber 10f to be returned back to the reservoir 19 or the brake fluid to be supplied from the reservoir 19 to the simulator chamber 10f, thereby allowing the input piston 15 to move frontward or backward in the longitudinal direction thereof without undergoing any hydraulic resistance.

The spool cylinder 24 is, as illustrated in FIGS. 2 and 4, fixed in the first cylindrical portion 12b of the fail-safe cylinder 12 (i.e., the cylindrical cavity 11p of the master cylinder 11) behind the second master piston 14. The spool cylinder 24 is of a substantially hollow cylindrical shape. The spool cylinder 24 has seal-retaining grooves 24a and 24b formed in an outer periphery thereof in the shape of a concave recess. Sealing members 57 and 58 are fit in the seal-retaining grooves 24a and 24b in direct contact with an entire circumference of the inner wall of the first cylindrical portion 12b to create a hermetical seal therebetween. The sealing members 57 and 58 develop mechanical friction between themselves and the inner wall of the first cylindrical portion 12b to hold the spool cylinder 24 from advancing in the first cylindrical portion 12b. The spool cylinder 24 has the rear end placed in contact with the stopper 12m, so that it is held from moving backward.

The spool cylinder 24 has formed therein a spool port 24c which communicates between inside and outside thereof. The spool port 24c communicates with the first inner ports 12d. The spool cylinder 24 has a first spool groove 24d formed in a portion of an inner wall thereof which is located behind the spool port 24c. The first spool groove 24d extends along an entire inner circumference of the spool cylinder 24 in the shape of a concave recess. The spool cylinder 24 also has a second spool groove 24f formed in a rear end of the inner wall thereof which is located behind the first spool groove 24d. The second spool groove 24f extends along the entire inner circumference of the spool cylinder 24 in the shape of a concave recess.

The spool cylinder 24 also has a fluid flow groove 24e formed in a portion of an outer wall thereof which is located behind the seal-retaining groove 24b. The fluid flow groove 24e extends along an entire outer circumference of the spool cylinder 24 in the shape of a concave recess. The third inner port 12f opens into the fluid flow groove 24e. Specifically, the fluid flow groove 24e defines a flow path leading to the reservoir 19 through the third inner port 12f and the sixth port 11g.

The spool piston 23 is made of a cylindrical shaft which is of a circular cross section. The spool piston 23 is disposed inside the spool cylinder 24 to be slidable in the longitudinal direction thereof. The spool piston 23 has a conical rear end defining a fixing portion 23a which is greater in outer diameter than another part thereof. The fixing portion 23a is disposed inside the retaining cavity 33c of the retaining piston 33. The C-ring 85 is fit in the C-ring groove 33e of the retaining piston 33 to stop the spool piston 23 from being removed forward from the retaining cavity 33c of the retaining piston 33, so that the spool piston 23 is held by the retaining piston 33 to be slidable in the longitudinal direction thereof. The spool piston 23 may alternatively be designed to have a portion which is formed other than the rear end and which engages the retaining cavity 33c instead of the fixing portion 23a.

The damper 37 is installed between the bottom of the retaining groove 33c and the rear end of the spool piston 23. The damper 37 is made of a cylindrical elastic rubber, but may alternatively be implemented by an elastically deformable member such as a coil spring or a diaphragm.

The spool piston 23 has a third spool groove 23b formed in an axial central portion of an outer wall thereof. The third spool groove 23b extends along an entire outer circumference of the spool piston 23 in the shape of a concave recess. The spool piston 23 also has a fourth spool groove 23c formed in a portion of the outer wall thereof which is located behind the third spool groove 23b. The fourth spool groove 23c extends along the entire outer circumference of the spool piston 23 in the shape of a concave recess. The spool piston 23 also has an elongated fluid flow hole 23e which extends along the longitudinal center line thereof from the front end behind the middle of the length of the spool piston 23. The spool piston 23 also has formed therein a first fluid flow port 23d and a second fluid flow port 23f which communicate between the fourth spool groove 23c and the fluid flow hole 23e.

Referring back to FIG. 2, the hydraulic booster 10 also includes a servo chamber 10c which is defined by the rear inner wall of the second master piston 14, the front end portion of the spool piston 23, and the front end of the spool cylinder 24 behind the retaining portion 14c of the second master piston 14 within the cylindrical cavity 11p of the master cylinder 11.

The first spool spring retainer 38 is, as clearly illustrated in FIG. 2, made up of a retaining disc 38a and a cylindrical fastener 38b. The retaining disc 38a is fit in an inner front end wall of the front cylindrical portion 12a of the fail-safe cylinder 12 and closes a front opening of the front cylindrical portion 12a. The cylindrical fastener 38b extends frontward from the front center of the retaining disc 38a. The cylindrical fastener 38b has an internal thread formed in an inner periphery thereof. The retaining disc 38a has a contact portion 38c formed on a central area of the rear end thereof. The retaining disc 38a also has fluid flow holes 38d passing through the thickness thereof.

The pushing member 40 is made of a rod and has a rear end engaging the internal thread of the cylindrical fastener 38b.

The second spool spring retainer 39 is, as illustrated in FIG. 4, made up of a hollow cylindrical body 39a and a ring-shaped retaining flange 39b The cylindrical body 39a has a front end defining a bottom 39c. The retaining flange 39b extends radially from the rear end of the cylindrical body 39a. The front end of the spool piston 23 is fit in the cylindrical body 39a in engagement with an inner periphery of the cylindrical body 39a, so that the second spool spring retainer 39 is secured to the front end of the spool piston 23. The bottom 39c has a through hole 39d formed therein. The second spool spring retainer 39 is, as can be seen from FIG. 2, aligned with the first spool spring retainer 38 at a given interval away from the contact portion 38c.

The spool spring 25 is, as illustrated in FIGS. 2 and 4, disposed between the retaining disc 38a of the first spool spring retainer 38 and the retaining flange 39b of the second spool spring retainer 39. The spool spring 25 works to urge the spool piston 23 backward relative to the fail-safe cylinder 12 (i.e., the master cylinder 11) and the spool cylinder 24.

The spring constant of the simulator spring 26 is set greater than that of the spool spring 25. The spring constant of the simulator spring 26 is also set greater than that of the pedal return spring 27.

Simulator

The simulator made up of the simulator spring 26, the pedal return spring 27, and the simulator rubber 34 will be described below. The simulator is a mechanism engineered to apply a reaction force to the brake pedal 71 to imitate an operation of a typical brake system, that is, make the driver of the vehicle experience the sense of depression of the brake pedal 71.

When the brake pedal 71 is depressed, the pedal return spring 27 contracts, thereby creating a reaction pressure (which will also be referred to as a reactive force) acting on the brake pedal 71. The reaction pressure is given by, as represented by a segment (1) in the graph of FIG. 8, the sum of a set load of the pedal return spring 27 and a product of the spring constant of the pedal return spring 27 and the stroke of the brake pedal 71 (i.e., the connecting member 31).

When the brake pedal 71 is further depressed, and the simulator rubber 34 hits the retaining piston 33, the pedal return spring 27 and the simulator spring 26 contract. The reaction pressure acting on the brake pedal is given by, as represented by a segment (2) in the graph of FIG. 8, a combination of physical loads generated by the simulator spring 26 and the pedal return spring 27. Specifically, a rate of increase in reaction pressure exerted on the brake pedal 71 during the stroke of the brake pedal 71 (i.e., unit of depression of the brake pedal 71) after the simulator rubber 34 contacts the retaining piston 33 will be greater than that before the simulator rubber 34 contacts the retaining piston 33.

When the simulator rubber 34 contacts the retaining piston 33, and the brake pedal 71 is further depressed, it usually causes the simulator rubber 34 to be contracted. The simulator rubber 34 has the spring constant which increases, in the nature thereof, as the simulator rubber 34 contracts. Therefore, there is, as indicated by a segment (3) in FIG. 8, a transient time for which the reaction pressure exerted on the brake pedal 71 changes gently to minimize the driver's discomfort arising from a sudden change in reaction pressure exerted on the foot of the driver of the vehicle.

Specifically, the simulator rubber 34 serves as a cushion to decrease the rate of change in reaction pressure acting on the brake pedal 71 during the depression thereof. The simulator rubber 34 of this embodiment is, as described above, secured to the movable member 32, but may be merely placed between opposed end surfaces of the movable member 32 and the retaining piston 33. The simulator rubber 34 may alternatively be attached to the rear end of the retaining piston 33.

Figure 8:
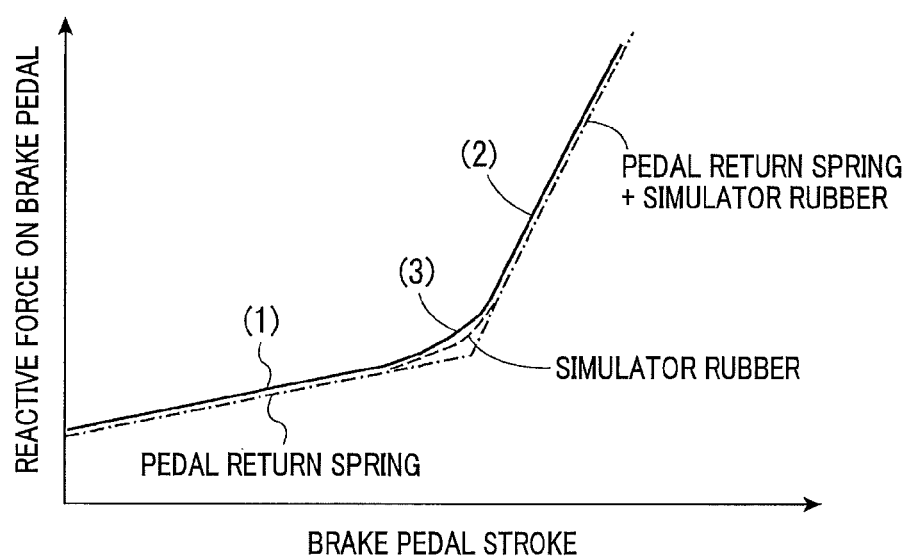
FIG. 8 is a graph which represents a relation between an amount of stroke of a brake pedal and a reactive force exerted on the brake pedal in response to depression of the brake pedal.

As described above, the reaction pressure exerted on the brake pedal 71 during the depression thereof increases at a smaller rate until the simulator rubber 34 contacts the retaining piston ((1) in FIG. 8) and then increases at a greater rate ((2) in FIG. 8), thereby giving a typical sense of operation (i.e., depression) of the brake pedal 71 to the driver of the vehicle.

Pressure Regulator

The pressure regulator 53 works to increase or decrease the master pressure that is the pressure of brake fluid delivered from the master chambers 10a and 10b to produce wheel cylinder pressure to be fed to the wheel cylinders WCfl, WCfr, WCrl, and WCrr and is engineered to achieve known anti-lock braking control or known electronic stability control to avoid lateral skid of the vehicle. The wheel cylinders WCfr and WCfl are connected to the first port 11b of the first master cylinder 10a through the pipe 52 and the pressure regulator 53. Similarly, the wheel cylinders WCrr and WCrl are connected to the third port 11d of the second master cylinder 10b through the pipe 51 and the pressure regulator 53.

Component parts of the pressure regulator 53 used to deliver the wheel cylinder pressure to, as an example, the wheel cylinder WCfr will be described below. The pressure regulator 53 also has the same component parts for the other wheel cylinders WCfl, WCrl, and WCrr, and explanation thereof in detail will be omitted here for the brevity of disclosure. The pressure regulator 53 is equipped with a pressure-holding valve 531, a pressure-reducing valve 532, a pressure control reservoir 533, a pump 534, an electric motor 535, and a hydraulic pressure control valve 536. The pressure-holding valve 531 is implemented by a normally-open electromagnetic valve (also called a solenoid valve) and controlled in operation by the brake ECU 6. The pressure-holding valve 531 is connected at one of ends thereof to the hydraulic pressure control valve 536 and at the other end to the wheel cylinder WCfr and the pressure-reducing valve 532.

The pressure-reducing valve 532 is implemented by a normally closed electromagnetic valve and controlled in operation by the brake ECU 6. The pressure-reducing valve 532 is connected at one of ends thereof to the wheel cylinder WCfr and the pressure-holding valve 531 and at the other end to a reservoir chamber 533e of the pressure control reservoir 533 through a first fluid flow path 157. When the pressure-reducing valve 532 is opened, it results in communication between the wheel cylinder WCfr and the reservoir chamber 533e of the pressure control reservoir 533, so that the pressure in the wheel cylinder WCfr drops.

The hydraulic pressure control valve 536 is implemented by a normally-open electromagnetic valve and controlled in operation by the brake ECU 6. The hydraulic pressure control valve 536 is connected at one of ends thereof to the first master chamber 10a and at the other end to the pressure-holding valve 531. When energized, the hydraulic pressure control valve 536 enters a differential pressure control mode to permit the brake fluid to flow from the wheel cylinder WCfr to the first master chamber 10a only when the wheel cylinder pressure rises above the master pressure by a given level.

The pressure control reservoir 533 is made up of a cylinder 533a, a piston 533b, a spring 533c, and a flow path regulator (i.e., flow control valve) 533d. The piston 544b is disposed in the cylinder 533a to be slidable. The reservoir chamber 533e is defined by the piston 533b within the cylinder 533a. The sliding of the piston 533b will result in a change in volume of the reservoir chamber 533e. The reservoir chamber 533e is filled with the brake fluid. The spring 533c is disposed between the bottom of the cylinder 533a and the piston 533b and urges the piston 533b in a direction in which the volume of the reservoir chamber 533e decreases.

The pipe 52 also leads to the reservoir chamber 533e through a second fluid flow path 158 and the flow regulator 533d. The second fluid flow path 158 extends from a portion of the pipe 52 between the hydraulic pressure control valve 536 and the first master chamber 10a to the flow regulator 533d. When the pressure in the reservoir chamber 533e rises, in other words, the piston 533b moves to increase the volume of the reservoir chamber 533e, the flow regulator 533d works to constrict a flow path extending between the reservoir chamber 533e and the second fluid flow path 158.

The pump 534 is driven by torque outputted by the motor 535 in response to an instruction from the brake ECU 6. The pump 534 has an inlet port connected to the reservoir chamber 533e through a third fluid flow path 159 and an outlet port connected to a portion of the pipe 52 between the hydraulic pressure control valve 536 and the pressure-holding valve 531 through a check valve z. The check valve z works to allow the brake fluid to flow only from the pump 534 to the pipe 52 (i.e., the first master chamber 10a). The pressure regulator 53 may also include a damper (not shown) disposed upstream of the pump 534 to absorb pulsation of the brake fluid outputted from the pump 534.

When the master pressure is not developed in the first master chamber 10a, the pressure in the reservoir chamber 533e leading to the first master chamber 10a through the second fluid flow path 158 is not high, so that the flow regulator 533d does not constrict the connection between the second fluid flow path 158 and the reservoir chamber 533e, in other words, maintains the fluid communication between the second fluid flow path and the reservoir chamber 533e. This permits the pump 534 to suck the brake fluid from the first master chamber 10a through the second fluid flow path 158 and the reservoir chamber 533e.

When the master pressure rises in the first master chamber 10a, it acts on the piston 533b through the second fluid flow path 158, thereby actuating the flow regulator 533d. The flow regulator 533d then constricts or closes the connection between the reservoir chamber 533e and the second fluid flow path 158.

When actuated in the above condition, the pump 534 discharges the brake fluid from the reservoir chamber 533e. When the amount of the brake fluid sucked from the reservoir chamber 533e to the pump 534 exceeds a given value, the flow path between the reservoir chamber 533e and the second fluid flow path 158 is slightly opened in the flow regulator 533d, so that the brake fluid is delivered from the first master chamber 10a to the reservoir chamber 533e through the second fluid flow path 158 and then to the pump 534.

When the pressure regulator 53 enters a pressure-reducing mode, and the pressure-reducing valve 532 is opened, the pressure in the wheel cylinder WCfr (i.e., the wheel cylinder pressure) drops. The hydraulic pressure control valve 536 is then opened. The pump 534 sucks the brake fluid from the wheel cylinder WCfr or the reservoir chamber 533e and returns it to the first master cylinder 10a.

When the pressure regulator 53 enters a pressure-increasing mode, the pressure-holding valve 531 is opened. The hydraulic pressure control valve 536 is then placed in the differential pressure control mode. The pump 534 delivers the brake fluid from the first master chamber 10a and the reservoir chamber 533e to the wheel cylinder WCfr to develop the wheel cylinder pressure therein.

When the pressure regulator 53 enters a pressure-holding mode, the pressure-holding valve 531 is closed or the hydraulic pressure control valve 536 is placed in the differential pressure control mode to keep the wheel cylinder pressure in the wheel cylinder WCfr as it is.

As apparent from the above discussion, the pressure regulator 53 is capable of regulating the wheel cylinder pressure regardless of the operation of the brake pedal 71. The brake ECU 6 analyzes the master pressure, speeds of the wheels Wfr, Wfl, Wrr, and Wrl, and the longitudinal acceleration acting on the vehicle to perform the anti-lock braking control or the electronic stability control by controlling on-off operations of the pressure-holding valve 531 and the pressure-reducing valve 532 and actuating the motor 534 as needed to regulate the wheel cylinder pressure to be delivered to the wheel cylinder WCfr.

Operation of Hydraulic Booster

The operation of the hydraulic booster 10 will be described below in detail. The hydraulic booster 10 is equipped with a spool valve that is an assembly of the spool cylinder 24 and the spool piston 23. Upon depression of the brake pedal 71, the spool valve is moved as a function of the driver's effort on the brake pedal 71. The hydraulic booster 10 then enters any one of the pressure-reducing mode, the pressure-increasing mode, and the pressure-holding mode.

Pressure-Reducing Mode

The pressure-reducing mode is entered when the brake pedal 71 is not depressed or the driver's effort (which will also be referred to as braking effort below) on the brake pedal 71 is lower than or equal to a frictional braking force generating level P2, as indicated in a graph of FIG. 5. When the brake pedal is, as illustrated in FIG. 2, released, so that the pressure-reducing mode is entered, the simulator rubber 34 (i.e., the movable member 32) is separate from the bottom 33a of the retaining piston 33.

When the simulator rubber 34 is located away from the bottom 33a of the retaining piston 33, the spool piston 23 is placed by the spool spring 25 at the rearmost position in the movable range thereof (which will also be referred to as a pressure-reducing position below). The spool port 24c is, as illustrated in FIG. 4, blocked by the outer periphery of the spool piston 23, so that the accumulator pressure that is the pressure in the accumulator 61 is not exerted on the servo chamber 10c.

The fourth spool groove 23c of the spool piston 23, as illustrated in FIG. 4, communicates with the second spool groove 24f of the spool cylinder 24. The servo chamber 10c, therefore, communicates with the reservoir 19 through a pressure-reducing flow path, as defined by the fluid flow hole 23e, the first fluid flow part 23d, the fourth spool groove 23c, the second spool groove 24f, the fluid flow path 12n, the fluid flow groove 24e, the third inner port 12f, and the sixth port 11g. This causes the pressure in the servo chamber 10c to be equal to the atmospheric pressure, so that the master pressure is not developed in the first master chamber 10a and the second master chamber 10b.

When the brake pedal 71 is depressed, and the simulator rubber 34 touches the bottom 33a of the retaining piston 33 to develop the pressure (which will also be referred to as an input pressure below) urging the spool piston 23 forward through the retaining piston 33, but such pressure is lower in level than the pressure, as produced by the spool spring 25 and exerted on the spool piston 23, the spool piston 23 is kept from moving forward in the pressure-reducing position. Note that the above described input pressure exerted on the spool piston 23 through the retaining piston 33 is given by subtracting a load required to compress the pedal return spring 27 from a load applied to the connecting member 31 upon depression of the brake pedal 71. When the load or effort applied to the brake pedal 71 is lower than or equal to the frictional braking force generating level P2, the hydraulic booster 10 is kept from entering the pressure-increasing mode, so that the servo pressure and the master pressure are not developed, thus resulting in no frictional braking force generated in the friction braking devices Bfl, Bfr, Brl, and Brr.

Pressure-Increasing Mode

Figure 6:
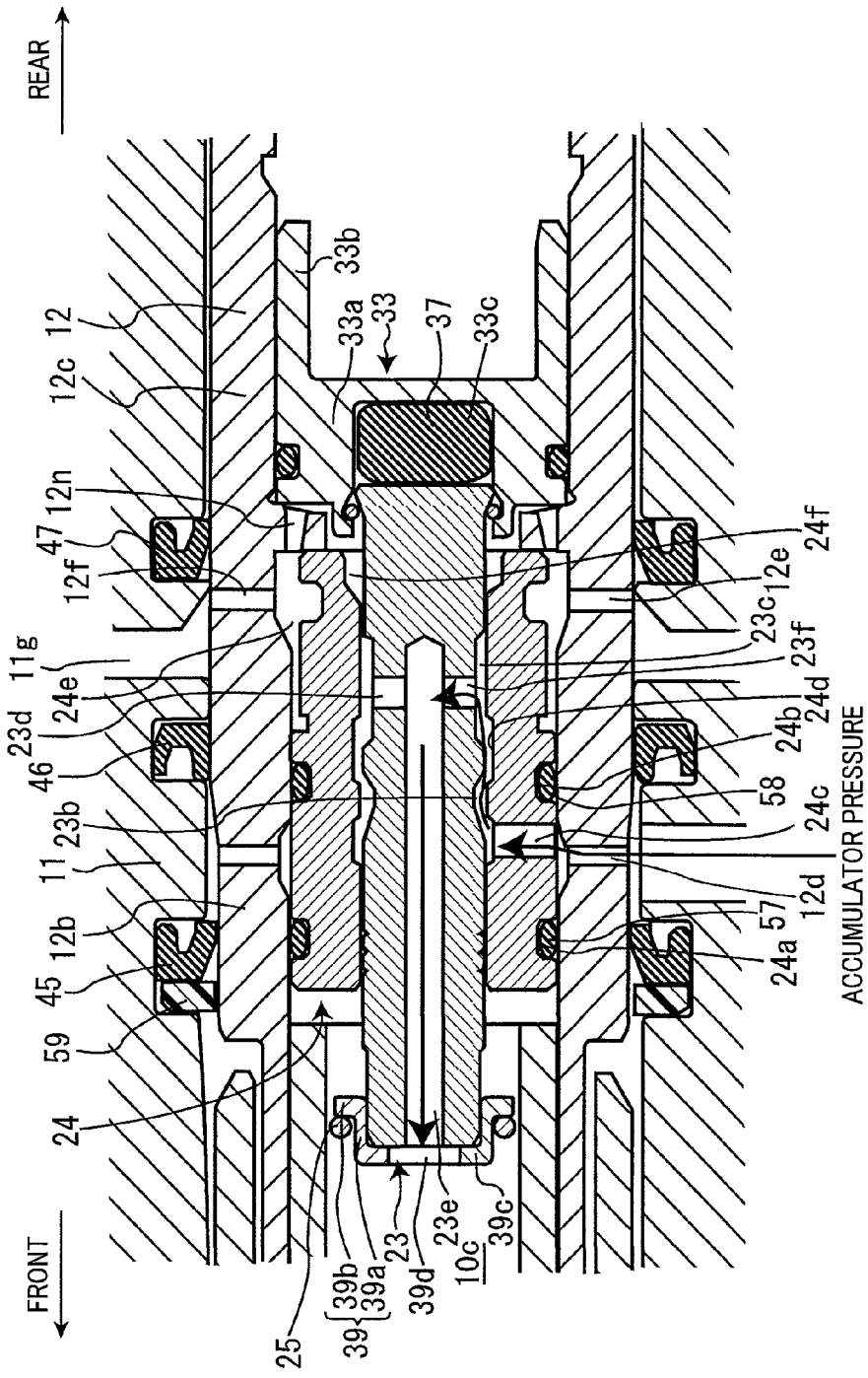
FIG. 6 is an enlarged view of a spool piston and a spool cylinder of a hydraulic booster of the braking device of FIG. 2 in a pressure-increasing mode.

When the effort on the brake pedal 71 exceeds the frictional braking force generating level P2, the hydraulic booster 10 enters the pressure-increasing mode. Specifically, the application of effort to the brake pedal 71 causes the simulator rubber 34 (i.e., the movable member 32) to push the retaining piston 33 to urge the spool piston 23 forward. The spool piston 23 then advances to a front position, as illustrated in FIG. 6 within the movable range against the pressure, as produced by the spool spring 25. Such a front position will also be referred to as a pressure-increasing position below.

When the spool piston 23 is in the pressure-increasing position, as illustrated in FIG. 6, the first fluid flow port 23d is closed by the inner periphery of the spool cylinder 24 to block the communication between the first fluid flow part 23d and the second spool groove 24f. This blocks the fluid communication between the servo chamber 10c and the reservoir 19.

Further, the spool port 24c communicates with the third spool groove 23b. The third spool groove 23b; the first spool groove 24d, and the fourth spool groove 23c communicate with each other, so that the pressure in the accumulator 61 (i.e., the accumulator pressure) is delivered to the servo chamber 10c through a pressure-increasing flow path, as defined by the first inner port 12d, the spool port 24c, the third spool groove 23b, the first spool groove 24d, the fourth spool groove 23c, the second fluid flow port 23f, the fluid flow hole 23e, and the connecting hole 39d. This results in a rise in servo pressure.

The rise in servo pressure will cause the second master piston 14 to move forward, thereby moving the first master piston 13 forward through the second return spring 18. This results in generation of the master pressure within the second master chamber 10b and the first master chamber 10a. The master pressure increases with the rise in servo pressure. In this embodiment, the diameter of the front and rear seals (i.e., the sealing members 43 and 44) of the second master piston 14 is identical with that of the front and rear seals (i.e., the sealing members 41 and 42) of the first master piston 13, so that the servo pressure will be equal to the master pressure, as created in the second master chamber 10b and the first master chamber 10a.

The generation of the master pressure in the second master chamber 10b and the first master chamber 10a will cause the brake fluid to be delivered from the second master chamber 10b and the first master chamber 10a to the wheel cylinders WCfr, WCfl, WCrr, and WCrl through the pipes 51 and 52 and the pressure regulator 53, thereby elevating the pressure in the wheel cylinders WCfr, WCfl, WCrr, and WCrl (i.e., the wheel cylinder pressure) to produce the frictional braking force applied to the wheels Wfr, Wfl, Wrr, and Wrl.

Pressure-Holding Mode

When the spool piston 23 is in the pressure-increasing position, the accumulator pressure is applied to the servo chamber 10c, so that the servo pressure rises. This causes a return pressure that is given by the product of the servo pressure and a cross-sectional area of the spool piston 23 (i.e., a seal area) to act on the pool piston 23 backward. When the sum of the return pressure and the pressure, as produced by the spool spring 25 and exerted on the spool piston 23, exceeds the input pressure exerted on the spool piston 23, the spool piston 23 is moved backward and placed in a pressure-holding position, as illustrated in FIG. 7, that is intermediate between the pressure-reducing position and the pressure-increasing position.

Figure 7:
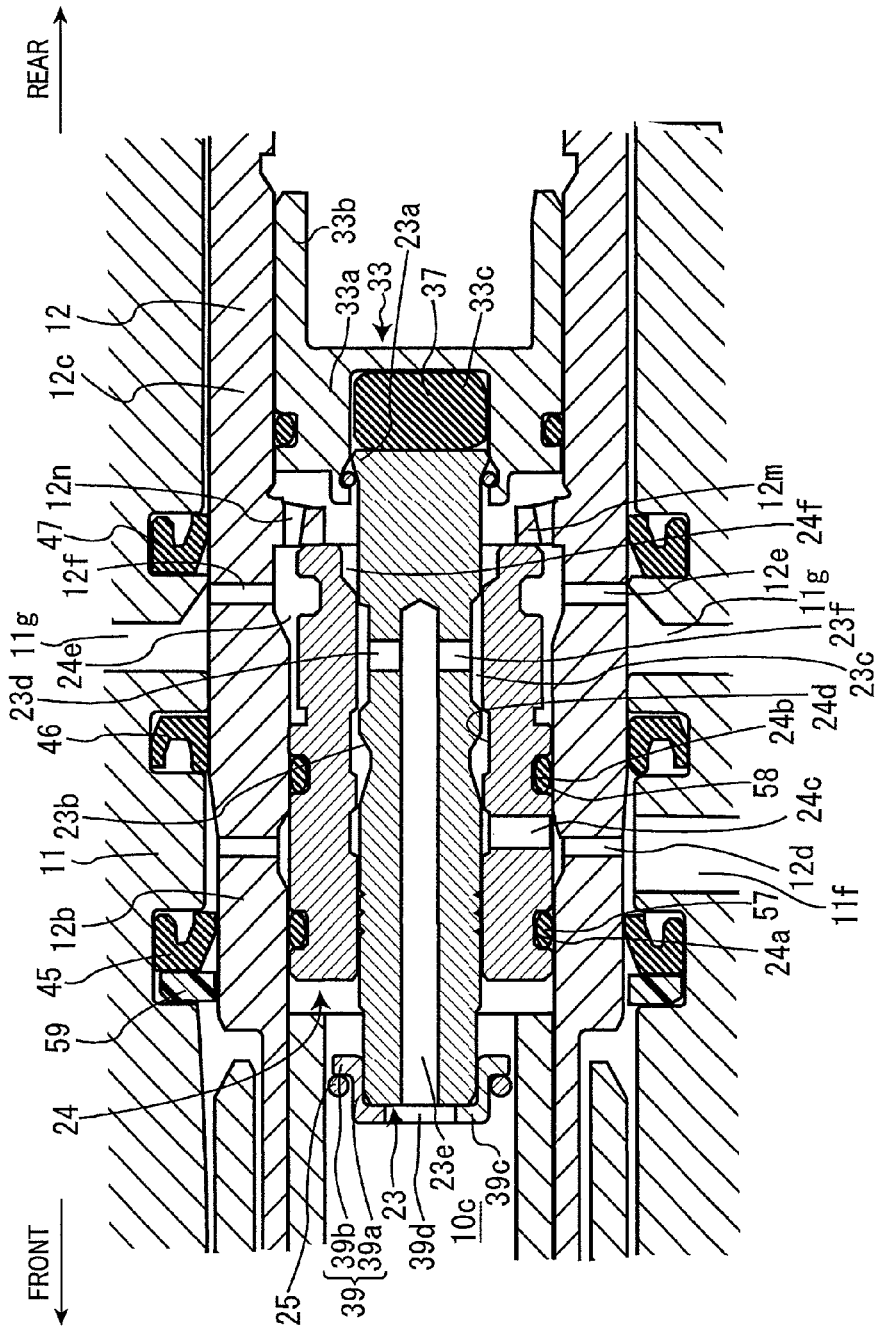
FIG. 7 is an enlarged view of a spool piston and a spool cylinder of a hydraulic booster of the braking device of FIG. 2 in a pressure-holding mode.

When the spool piston 23 is in the pressure-holding position, as illustrated in FIG. 7, the spool port 24c is closed by the outer periphery of the spool piston 23. The fourth spool groove 23c is also closed by the inner periphery of the spool cylinder 24. This blocks the communication between the spool port 24c and the second fluid flow port 23f to block the communication between the servo chamber 10c and the accumulator 61, so that the accumulator pressure is not applied to the servo chamber 10c.

Further, the fourth spool groove 23c is closed by the inner periphery of the spool cylinder 24, thereby blocking the communication between the first fluid flow port 23d and the second spool groove 24f to block the communication between the servo chamber 10c and the reservoir 19, so that the servo chamber 10c is closed completely. This causes the servo pressure, as developed upon a change from the pressure-increasing mode to the pressure-holding mode, to be kept as it is.

When the sum of the return pressure exerted on the spool piston 23 and the pressure, as produced by the spool spring 25 and exerted on the spool piston 23, is balanced with the input pressure exerted on the spool piston 23, the pressure-holding mode is maintained. When the effort on the brake pedal 71 drops, so that the input pressure applied to the spool piston 23 decreases, and the sum of the return pressure applied to the spool piston 23 and the pressure, as produced by the spool spring 25 and exerted on the spool piston 23, exceeds the input pressure exerted on the spool piston 23, it will cause the spool piston 23 to be moved backward and placed in the pressure-reducing position, as illustrated in FIG. 4. The pressure-reducing mode is then entered, so that the servo pressure in the servo chamber 10c drops.

Alternatively, when the spool piston 23 is in the pressure-holding position, and the input pressure applied to the spool piston 23 rises with an increase in braking effort on the brake pedal 71, so that the input pressure acting on the spool piston 23 exceeds the sum of the return pressure exerted on the spool piston 23 and the pressure, as produced by the spool spring 25 and exerted on the spool piston 23, it will cause the spool piston 23 to be moved forward, and placed in the pressure-increasing position, as illustrated in FIG. 6. The pressure-increasing mode is then entered, so that the servo pressure in the servo chamber 10c rises.

Usually, the friction between the outer periphery of the spool piston 23 and the inner periphery of the spool cylinder 24 results in hysteresis in the movement of the spool piston 23, which disturbs the movement of the spool piston 23 in the longitudinal direction thereof, thus leading to less frequent switching from the pressure-holding mode to either of the pressure-reducing mode or the pressure-increasing mode.

Relation Between Regenerative Braking Force and Frictional Braking Force

The relation between the regenerative braking force and the frictional braking force will be described below with reference to FIG. 5. When the braking effort on the brake pedal 71 is lower than or equal to the frictional braking force generating level P2, the hydraulic booster 10 is kept in the pressure-reducing mode without being switched to the pressure-increasing mode, so that the frictional braking force is not created. The brake system B has a regenerative braking force generating level P1 indicative of the braking effort applied to the brake pedal 71 which is set lower than the frictional braking force generating level P2.

The brake system B is equipped with the brake sensor 72. The brake sensor 72 is a pedal position sensor which measures an amount of stroke of the brake pedal 71. The driver's effort (i.e. the braking effort) applied to the brake pedal 71, as can be seen in the graph of FIG. 8, has a given correlation with the amount of stroke of the brake pedal 71. The brake ECU 6, thus, determines whether the braking effort has exceeded the regenerative braking force generating level P1 or not using the output from the brake sensor 72.

Figure 5:
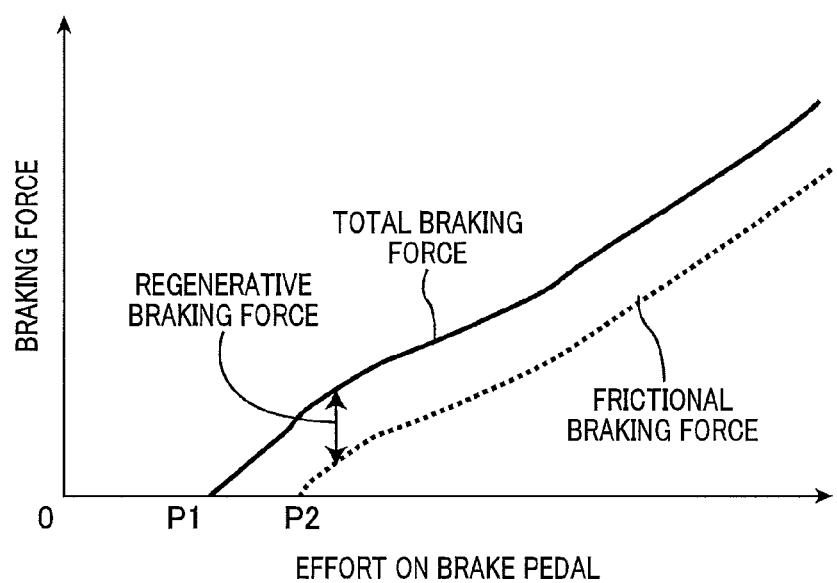
FIG. 5 is a graph which represents a relation between a braking effort acting on a brake pedal and a braking force.

When the brake pedal 71 has been depressed, and the brake ECU 6 determines that the braking effort on the brake pedal 71 has exceeded the regenerative braking force generating level P1, as indicated in FIG. 5, the brake ECU 6, as described above, calculates the target regenerative braking force as a function of the output from the brake sensor 72 and outputs a signal indicative thereof to the hybrid ECU 900.

The hybrid ECU 900 uses the speed V of the vehicle, the state of charge in the battery 507, and the target regenerative braking force to compute the actually producible regenerative braking force that is a regenerative braking force the regenerative braking system A is capable of producing actually. The hybrid ECU 900 then controls the operation of the regenerative braking system A to create the actually producible regenerative braking force.

When determining that the actually producible regenerative braking force does not reach the target regenerative braking force, the hybrid ECU 900 subtracts the actually producible regenerative force from the target regenerative braking force to derive an additional frictional braking force. The event that the actually producible regenerative braking force does not reach the target regenerative braking force is usually encountered when the speed V of the vehicle is lower than a given value or the battery 507 is charged fully or near fully. The hybrid ECU 900 outputs a signal indicative of the additional frictional braking force to the brake ECU 6.

Upon reception of the signal from the hybrid ECU 900, the brake ECU 6 controls the operation of the pressure regulator 53 to control the wheel cylinder pressure to make the friction braking devices Bfl, Bfr, Brl, and Brr create the additional regenerative braking force additionally. Specifically, when it is determined that the actually producible regenerative braking force is less than the target regenerative braking force, the brake ECU 6 actuates the pressure regulator 53 to develop the additional regenerative braking force in the friction braking devices Bfl, Bfr, Brl, and Brr to compensate for a difference (i.e., shortfall) between the target regenerative braking force and the actually producible regenerative braking force, thereby achieving the target regenerative braking force.

As described above, when the hybrid ECU 900 has decided that it is impossible for the regenerative braking system A to produce a required regenerative braking force (i.e., the target regenerative braking force), the pressure regulator 53 regulates the pressure to be developed in the wheel cylinders WCfl, WCfr, WCrl, and WCrr to produce a degree of frictional braking force through the friction braking devices Bfl, Bfr, Brl, and Brr which is equivalent to a shortfall in the regenerative braking force.

Operation of Hydraulic Booster in Event of Malfunction Of Hydraulic Pressure Generator When the hydraulic pressure generator 60 has failed in operation, so that the accumulator pressure has disappeared, the fail-safe spring 36 urges or moves the fail-safe cylinder 12 forward until the flange 12h of the fail-safe cylinder 12 hits the stopper ring 21c of the stopper 21. The second cylindrical portion 12c of the fail-safe cylinder 12 then blocks the seventh port 11h of the master cylinder 11 to close the simulator chamber 10f liquid-tightly.

When the simulator chamber 10f is hermetically closed, and the brake pedal 71 is depressed, it will cause the braking effort applied to the brake pedal 71 to be transmitted from the input piston 15 to the retaining piston 33 through the connecting member 31 and the operating rod 16, so that the retaining piston 33, the spool piston 23, and the second spool spring retainer 39 advance.

Upon hitting of the retaining piston 33 on the stopper 12m in the fail cylinder 12, the braking effort on the brake pedal 71 is transmitted to the fail-safe cylinder 12 through the stopper 12m, so that the fail-safe cylinder 12 advances. This causes the pushing member 40 to contact the retaining portion 14c of the second master piston 14 or the pressing surface 12i of the fail-safe cylinder 12 to contact the rear end of the second cylindrical portion 14b of the second master piston 14, so that the braking effort on the brake pedal 71 is inputted to the second master piston 14. In this way, the fail-safe cylinder 12 pushes the second master piston 14.

As apparent from the above discussion, in the event of malfunction of the hydraulic pressure generator 60, the braking effort applied to the brake pedal 71 is transmitted to the second master piston 14, thus developing the master pressure in the second master chamber 10b and the first master chamber 10a. This produces the frictional braking force in the friction braking devices Bfl, Bfr, Brl, and Brr to decelerate or stop the vehicle safely.

The depression of the brake pedal 71 in the event of malfunction of the hydraulic pressure generator 60, as described above, results in frontward movement of the fail-safe cylinder 12, thereby causing the first spring retainer 29 for the pedal return spring 27 to move forward. This causes the braking effort on the brake pedal 71 not to act on the pedal return spring 27. The braking effort is, therefore, not attenuated by the compression of the pedal return spring 27, thereby avoiding a drop in the master pressure arising from the attenuation of the braking effort.

In the event of malfunction of the hydraulic pressure generator 60, the fail-safe cylinder 12 advances, so that the second cylindrical portion 12c which has the outer diameter c greater than the outer diameter b of the first cylindrical portion 12b passes through the sealing member 45. The master cylinder 11 is designed to have the inner diameter greater than the outer diameter c of the second cylindrical portion 12c for allowing the second cylindrical portion 12c to move forward. Consequently, when the hydraulic pressure generator 60 is operating properly, the outer periphery of the first cylindrical portion 12b is, as can be seen in FIG. 2, separate from the inner periphery of the master cylinder 11 through air gap.

The entire area of the front end of the sealing member 45 is, as clearly illustrated in FIG. 4, in direct contact with the support member 59. The inner peripheral surface of the support member 59 is in direct contact with the outer peripheral surface of the first cylindrical portion 12b of the fail-safe cylinder 12. In other words, the sealing member 45 is firmly held at the front end thereof by the support member 59 without any air gap therebetween, thus avoiding damage to the sealing member 45 when the fail-safe cylinder 12 moves forward in the event of malfunction of the hydraulic pressure generator 60, so that the first cylindrical portion 12b slides on the sealing member 45.

The support member 59, as illustrated in FIG. 3, has a slit 59a formed therein. The slit 59a makes the support member 59 expand outwardly upon the forward movement of the fail-safe cylinder 12, thereby allowing the second cylindrical portion 12c to pass through the support member 59. The sealing member 45 is, as described above, held at the front end thereof by the support member 59, thus avoiding damage to the sealing member 45 upon the passing of the second cylindrical portion 12c through the support member 59.

If the accumulator pressure has risen excessively, so that the pressure in the fifth port 11f has exceeded a specified level, the mechanical relief valve 22 will be opened, so that the brake fluid flows from the fifth port 11f to the sixth port 11g and to the reservoir 19. This avoids damage to the pipe 67 and the hydraulic booster 10.

The brake system B of this embodiment offers the following advantages.

The simulator spring 26, as described above, urges the input piston 15 backward to function as a brake simulator which applies a reaction force to the brake pedal 71 to imitate an operation of a typical brake system. The simulator spring 26 is disposed inside the cylindrical cavity 11p of the master cylinder 11 of the hydraulic booster 10. In other words, the master pistons 13 and 14, the spool valve (i.e., the spool cylinder 24 and the spool piston 23), the simulator spring 26, and the input piston 15 are arranged in alignment with each other (i.e., in series with each other) within the cylindrical cavity 11p of the master cylinder 11. This layout facilitates the ease with which the brake system B is mounted in the vehicle in the form of a frictional brake unit.

The simulator rubber 34 is disposed away from the retaining piston 33 which supports the spool piston 23. This layout keeps the braking effort applied to the brake pedal 71 from being transmitted to the spool piston 23 until the simulator rubber 34 retained by the movable member 32 contacts the retaining piston 33. In other words, the frictional braking force is not created immediately after the depression of the brake pedal 71. After the braking effort exceeds the regenerative braking force generating level P1, as shown in the graph of FIG. 5, the regenerative braking system A starts developing the regenerative braking force. This minimizes the dissipation of thermal energy, into which kinetic energy of the vehicle is converted, from the friction braking devices Bfl, Bfr, Brl, and Brr, thereby enhancing the efficiency in using the kinetic energy of the vehicle as the regenerative braking force through the regenerative braking system A.

The movable member 32 which is disposed between the retaining piston 33 and the input piston 15 serves as a stopper to restrict the frontward movement of the input piston 15 upon depression of the brake pedal 71, thereby avoiding damage to the simulator spring 26.

The brake system B is engineered so as to switch among the pressure-reducing mode, the pressure-increasing mode, and the pressure-holding mode according to the longitudinal location of the spool piston 23, as moved in response to the braking effort on the brake pedal 71, within the spool cylinder 24. In other words, the frictional braking force is variably developed by the spool valve that is a mechanism made up of the spool piston 23 and the spool cylinder 24. This enables the frictional braking force to be changed more linearly than the case where the frictional braking force is regulated using a solenoid valve.

Specifically, in the case of use of the solenoid valve, a flow of brake fluid usually develops a physical force to lift a valve away from a valve seat when the solenoid valve is opened. This may lead to an excessive flow of the brake fluid from the solenoid valve, thus resulting in an error in regulating the pressure of the brake fluid and instability in changing the frictional braking force. In order to alleviate such a drawback, the brake system B is designed to have the spool piston 23 on which the driver's effort on the brake pedal 71 is exerted and switch among the pressure-reducing mode, the pressure-increasing mode, and the pressure-holding mode as a function of a change in the driver's effort, thereby developing the frictional braking force according to the driver's intention.

The damper 37 is, as illustrated in FIG. 4, installed between the retaining groove 33c of the retaining piston 33 and the rear end surface of the spool piston 23. The damper 37 is deformable or compressible to attenuate or absorb the impact which results from a sudden rise in pressure in the servo chamber 10c and is transmitted from the spool piston 23 to the retaining piston 33, thus reducing the impact reaching the brake pedal 71 to alleviate the discomfort of the driver.

Beneficial Effect Offered by Structure of Rear of Hydraulic Booster

The stopper 21, as illustrated in FIG. 9, has the concave rear end defining the recessed seat 21e with which the pressing surface 28a of the movable member 29 is in slidable contact, which permits the movable member 28 to move relative to the stopper 21. Specifically, the movable member 28 and the first spring retainer 29 move relative to the master cylinder 11 in response to the depression of the brake pedal 71, thereby absorbing an undesirable load on the brake system B. This improves the durability and operability of the brake system B.

The collar 90 is fit on the outer periphery of the operating rod 16 and occupies an air gap (i.e., the clearance C1 in FIG. 9) between the inner peripheral wall of the first spring retainer 29 (i.e., the flange 29b) and the outer peripheral surface of the operating rod 16, thereby eliminating the backlash or play of the operating rod 16. This also results in improved durability and operability of the brake system B.

The first spring retainer 29 and the movable member 28 are made of separate or individual parts and designed to be slidable on one another in a radial direction perpendicular to the axial direction thereof. The pressure which arises from the depression of the brake pedal 71 and results in a misalignment between the longitudinal center lines (i.e. axes) of the first spring retainer 29 and the operating rod 16 is, therefore, absorbed by the sliding movement of the first spring retainer 29 relative to the movable member 28 in the radial direction thereof. This ensures the stability in alignment of the first spring retainer 29 and the operating rod 16 and also improves the durability and operability of the brake system B.

Modifications

The braking device (i.e., the brake system B) of the above embodiment is equipped with the brake sensor 72 which measures the degree of effort applied to the brake pedal 71 in the form of the amount of stroke of the brake pedal 71, but the brake sensor 72 may be designed as a stroke sensor to measure the amount of stroke of the input piston 15, the connecting member 31 or the operating rod 16 as representing the degree of effort exerted on the brake pedal 71. The brake sensor 72 may alternatively be engineered as a load sensor to detect a degree of physical load acting on the brake pedal 71, the input piston 15, the connecting member 31, or the operating rod 16.

The hydraulic booster 10 may be designed to have an additional simulator spring disposed between the movable member 32 and the retaining piston 33. The additional simulator spring is preferably set smaller in spring constant than the simulator spring 26.

The brake system B is, as described above, mounted in the hybrid vehicle equipped with the regenerative braking system A, but may be installed in another type of vehicle with no regenerative braking system.

Figure 10:
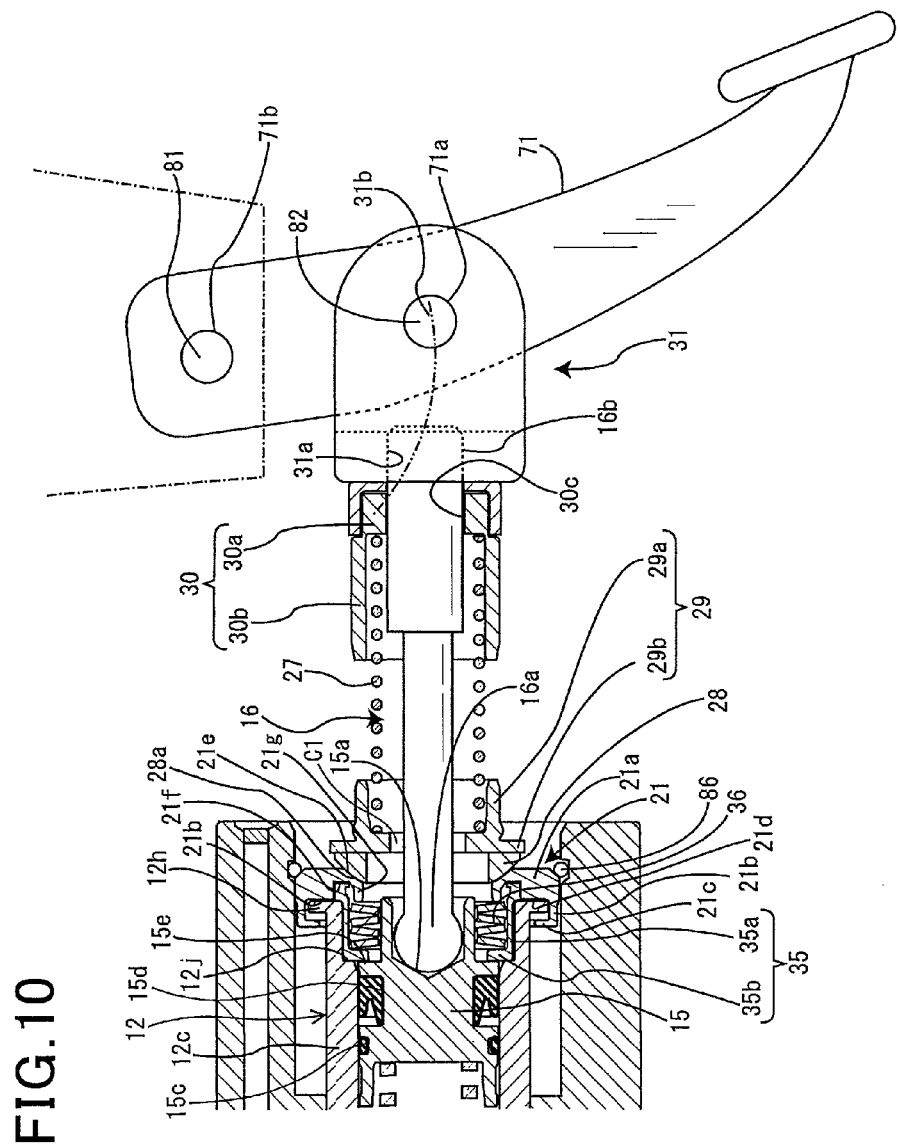
FIG. 10 is a partially enlarged view of a rear portion of a hydraulic booster in a modified form.

The brake system B is, as described with reference to FIGS. 9 and 10, equipped with the collar 90 used as a backlash eliminator to minimize or eliminate the clearance between the operating rod 16 and the first spring retainer 29, but the collar 90 may be omitted, as illustrated in FIG. 10. The movable member 28 is, as described already, slidable on the stopper 21, thus improving the durability and operability of the brake system B. The movable member 28 and the first spring retainer 29 may be formed by a single piece member as long as the movable member 28 is designed to be slidable on the stopper 21.

The brake system B uses the brake pedal 71 as a brake actuating member which inputs or transmits the driver's braking effort to the input piston 15, but may alternatively employ a brake lever or a brake handgrip instead of the brake pedal 71. The brake system B may also be used with motorbikes or another type of vehicles.

The brake system B of the above embodiments is, as described above, designed as a vehicular braking device and may be constructed by a combination of the above described components: the master cylinder 11, the accumulator 61, the reservoir 19, a master piston (i.e., the first and second master piston 13 and 14), a spool valve (i.e., the spool piston 23 and the spool cylinder 24), a brake actuating member (i.e. the brake pedal 71), the input piston 15, a braking simulator member (i.e., the simulator spring 26), the fail-safe cylinder 12, the fail-safe spring 36, and the operating rod 16.

The master cylinder 11 has a given length with a front and a rear in the axial direction thereof. The master cylinder has the cylindrical cavity 11p extending in the longitudinal direction of the master cylinder 11. The accumulator 61 connects with the cylindrical cavity 11p of the master cylinder 11 and stores the brake fluid under pressure. The reservoir 19 connects with the cylindrical cavity 11p of the master cylinder 11 and stores the brake fluid therein. The master piston is disposed in the cylindrical cavity 11p to be slidable in the longitudinal direction thereof. The master piston has a front oriented to the front of the master cylinder 11 and a rear oriented to the rear of the master cylinder 11. The master piston defines a master chamber (i.e., the first master chamber 10a and the second master chamber 10b) and the servo chamber 10c within the cylindrical cavity 11p. The master chamber is formed on the front side of the master piston and stores therein the brake fluid to be delivered to a brake device (the friction braking devices Bfl, Bfr, Brl, or Brr) working to apply a frictional braking force to a wheel (i.e., the wheel Wfl, Wfr, Wrl, or Wrr of the vehicle. The servo chamber 10c is formed on the rear side of the master piston. The spool valve is disposed on the rear side of the master piston within the cylindrical cavity 11p of the master cylinder 11. The spool valve works to switch among the pressure-reducing mode, the pressure-increasing mode, and the pressure-holding mode. The pressure-reducing mode is to communicate between the servo chamber 10c and the reservoir chamber. The pressure-increasing mode is to communicate between the servo chamber 10c and the accumulator 61. The pressure-holding mode is to hermetically close the servo chamber 10c. The brake actuating member 71 is disposed behind the master cylinder. The braking effort, as produced by the driver of the vehicle, is transmitted to the brake actuating member 71. The input piston 15 is disposed behind the spool valve to be slidable within the cylindrical cavity 11p of the master cylinder 11. The input piston 15 connects with the brake actuating member 71 and is moved in response to the braking effort transmitted from the brake actuating member 71 to drive the spool valve. The braking simulator member (i.e., the simulator spring 26) is disposed ahead of the input piston 15 within the cylindrical cavity 11p of the master cylinder 11. The braking simulator member works to urge the input piston 15 rearward. The fail-safe cylinder 12 is disposed behind the master piston to be slidable within the cylindrical cavity of the master cylinder. The fail-safe cylinder 12 includes the first cylindrical portion 12b and the second cylindrical portion 12c disposed behind the first cylindrical portion 12b. The second cylindrical portion 12c is greater in outer diameter than the first cylindrical portion 12b. The fail-safe spring 36 works to urge the fail-safe cylinder 12 toward the front of the master cylinder 11. The operating rod 16 transmits the braking effort from the brake actuating member 71 to the input piston 15.

The input piston 15 is slidable in the fail-safe cylinder 12 in the longitudinal direction thereof. The master cylinder has a supply port (i.e., the fifth port 11f) which opens to the outer periphery of the first cylindrical portion 12b and to which the brake fluid is supplied from the accumulator 61. The master cylinder 11 and the fail-safe cylinder 12 have reservoir flow paths (i.e., the seventh port 11h and the fourth inner ports 12g) formed therein. The reservoir flow paths establish fluid communication between the reservoir 19 and a fluid chamber (i.e., the simulator chamber 10f) that is a portion of the cylindrical cavity 11p and defined ahead the input piston 15 inside the fail-safe cylinder 12 when the fail-safe cylinder 12 is in a rearmost position in a given allowable range.

When the brake fluid is being supplied from the accumulator 61 to the supply port (i.e., the fifth 11f), force, as developed by pressure of the brake fluid and a difference in traverse cross-section between the first cylindrical portion 21b and the second cylindrical portion 12c, presses the fail-safe cylinder 12 rearward in the master cylinder 11 to place the fail-safe cylinder 12 at the rearmost position.

When the brake fluid is not being supplied from the accumulator 61 to the supply port, the fail-safe cylinder 12 is urged by the fail-safe spring 36 frontward to block the reservoir flow path to hermetically close the fluid chamber defined ahead the input piston inside the fail-safe cylinder 12, thereby allowing the fail-safe cylinder 12 to press the master piston in response to the braking effort transmitted to the input piston 15.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:
1. A braking device for a vehicle comprising:
a master cylinder which has a given length with a front and a rear, the master cylinder having a cylindrical cavity extending in a longitudinal direction of the master cylinder;
an accumulator which connects with the cylindrical cavity of the master cylinder and in which brake fluid is stored under pressure;
a reservoir which connects with the cylindrical cavity of the master cylinder and in which the brake fluid is stored;
a master piston which is disposed in the cylindrical cavity to be slidable in a longitudinal direction thereof, the master piston having a front oriented toward the front of the master cylinder and a rear oriented to the rear of the master cylinder, the master piston defining a master chamber and a servo chamber within the cylindrical cavity, the master chamber being formed on a front side of the master piston and storing therein the brake fluid to be delivered to a brake device working to apply a frictional braking force to a wheel of a vehicle, the servo chamber being formed on a rear side of the master piston;

a spool valve which is disposed on the rear side of the master piston within the cylindrical cavity of the master cylinder, the spool valve working to switch among a pressure-reducing mode, a pressure-increasing mode, and a pressure-holding mode, the pressure-reducing mode being to communicate between the servo chamber and the reservoir chamber, the pressure-increasing mode being to communicate between the servo chamber and the accumulator, the pressure-holding mode being to hermetically close the servo chamber;

a brake actuating member which is disposed behind the master cylinder and to which a braking effort, as produced by a driver of the vehicle, is transmitted;

an input piston which is disposed behind the spool valve to be slidable within the cylindrical cavity of the master cylinder, the input piston connecting with the brake actuating member and being moved in response to the braking effort transmitted from the brake actuating member to drive the spool valve;

a braking simulator member which is disposed ahead of the input piston within the cylindrical cavity of the master cylinder, the braking simulator member working to urge the input piston rearward;

a fail-safe cylinder which is disposed behind the master piston to be slidable in a longitudinal direction thereof within the cylindrical cavity of the master cylinder, the fail-safe cylinder including a first cylindrical portion and a second cylindrical portion disposed behind the first cylindrical portion, the second cylindrical portion being greater in outer diameter than the first cylindrical portion;

a fail-safe spring which works to urge the fail-safe cylinder toward the front of the master cylinder;

an operating rod which transmits the braking effort from the brake actuating member to the input piston;

a first retainer which is of a hollow cylindrical shape and disposed around and away from an outer periphery of a front portion of the operating rod;

a second retainer which is of a hollow cylindrical shape and secured to an outer periphery of a rear portion of the operating rod;

a return spring which is disposed between the first and second retainers so as to urge the first retainer frontward and the second retainer rearward;

a stopper which is of a cylindrical shape and supports rear ends of the fail-safe spring and the fail-safe cylinder to stop the fail-safe cylinder from advancing over a given allowable range; and a movable member which is disposed on a front end of the first retainer which faces the front of the master cylinder, the movable member having a front surface which is oriented to the front of the master cylinder and defines a pressing surface of a convex dome-shape, wherein the input piston is slidable in the fail-safe cylinder in a longitudinal direction thereof, wherein the master cylinder has a supply port which opens to an outer periphery of the first cylindrical portion and to which the brake fluid is supplied from the accumulator;

wherein the master cylinder and the fail-safe cylinder have reservoir flow paths formed therein, the reservoir flow paths establishing fluid communication between the reservoir and a fluid chamber that is a portion of the cylindrical cavity and defined in front of the input piston inside the fail-safe cylinder when the fail-safe cylinder is in a rearmost position in the given allowable range, wherein when the brake fluid is being supplied from the accumulator to the supply port, force, as developed by pressure of the brake fluid and a difference in traverse cross-section between the first cylindrical portion and the second cylindrical portion, presses the fail-safe cylinder rearward in the master cylinder to place the fail-safe cylinder at the rearmost position, wherein when the brake fluid is not being supplied from the accumulator to the supply port, the fail-safe cylinder is urged by the fail-safe spring frontward to block the reservoir flow path to hermetically close the fluid chamber defined ahead the input piston inside the fail-safe cylinder, thereby allowing the fail-safe cylinder to press the master piston in response to the braking effort transmitted to the input piston, wherein the stopper has a concave dome-shaped seat formed in a rear end thereof facing the rear of the master cylinder, and wherein the pressing surface is placed in slidable contact with the seat of the stopper.

2. A braking device as set forth in claim 1, wherein said movable member and the first retainer are made of separate parts and designed to be slidable on one another in a direction perpendicular to an axial direction thereof.

3. A braking device as set forth in claim 1, further comprising a backlash eliminator which is disposed on the outer periphery of the front portion of the operating rod and works to minimize backlash between the first retainer and the operating rod.

* * * * *